US010762541B2

(12) United States Patent
Teshima

(10) Patent No.: US 10,762,541 B2
(45) Date of Patent: Sep. 1, 2020

(54) DEVICES AND METHODS FOR INFORMATION PROCESSING AND ACCESS CONTROL

(71) Applicant: AMADELLAS CORPORATION, Tokyo (JP)

(72) Inventor: Taro Teshima, Tokyo (JP)

(73) Assignee: AMADELLAS CORPORATION, Tokyo (JP)

( * ) Notice: Subject to any disclaimer, the term of this patent is extended or adjusted under 35 U.S.C. 154(b) by 468 days.

(21) Appl. No.: 15/077,889

(22) Filed: Mar. 22, 2016

(65) Prior Publication Data

US 2016/0203531 A1 Jul. 14, 2016

Related U.S. Application Data

(63) Continuation of application No. PCT/JP2014/073268, filed on Sep. 3, 2014.

(30) Foreign Application Priority Data

Oct. 1, 2013 (JP) .................................. 2013-206122

(51) Int. Cl.
*G06Q 30/04* (2012.01)
*G06Q 10/10* (2012.01)
(Continued)

(52) U.S. Cl.
CPC ......... *G06Q 30/04* (2013.01); *G06F 21/6218* (2013.01); *G06Q 10/107* (2013.01);
(Continued)

(58) Field of Classification Search
CPC ...... G06Q 30/04; G06Q 10/107; G06Q 20/10; G06Q 20/102
(Continued)

(56) References Cited

U.S. PATENT DOCUMENTS 8,538,878 B2 * 9/2013 Meier .................... G06Q 20/00 705/34
9,979,720 B2 * 5/2018 Bhimanaik ............. H04L 63/10
(Continued)

FOREIGN PATENT DOCUMENTS

JP 2001-297027 10/2001
JP 2003-187159 8/2003
(Continued)

OTHER PUBLICATIONS

International Search Report in corresponding WIPO application PCT/JP2014/073268, dated Dec. 9, 2014.
(Continued)

*Primary Examiner* — Vanel Frenel
(74) *Attorney, Agent, or Firm* — Ryan Alley IP

(57) ABSTRACT

A user information storage unit stores user information associating, for each user, an electronic mail address and at least one location information piece of the user with each other. A registration unit generates a code for each user using the location information and electronic mail address according to a predetermined rule. An invoice information storage unit stores invoice information including the electronic mail address of a first user included in the user information. When receiving an access request for accessing invoice information from a second user whose user information is stored in the user information storage unit, the registration unit determines whether the first code of the first user matches the second code of the second user, and if the first and second codes match, grants the second user access rights to access invoice information generated by the first user and stored in the invoice information storage unit.

6 Claims, 31 Drawing Sheets

| USER MANAGEMENT NO. | HEADQUARTERS LOCATION INFORMATION | HEADQUARTERS LOCATION (LATITUDE) | HEADQUARTERS LOCATION (LONGITUDE) | D3 GENERATION INFORMATION MANAGEMENT SECTION | |
|---|---|---|---|---|---|
| | | | | GENERAL-PURPOSE COMPANY GROUP CODE | GENERAL-PURPOSE COMPANY CODE |
| Ag1 | ... Latitude, ... Longitude | 10335225 | 11305223 | jp20130510335225113052223jp.xxx | jp20130510335225113052223jp.xxxxxx |
| A1 | ... Latitude, ... Longitude | 10335225 | 11305223 | jp20130510335225113052223jp.xxx | jp20130510335225113052223jp.xxxxxx |
| A2 | ... Latitude, ... Longitude | 10335225 | 11305223 | jp20130510335225113052223jp.xxx | jp20130510335225113052223jp.xxxxxx |
| Ag2 | ... Latitude, ... Longitude | 10335225 | 11305223 | jp20130510335225113052223jp.xxx | jp20130510335225113052223jp.xxxxxx |
| A3 | ... Latitude, ... Longitude | 10335225 | 11305223 | jp20130510335225113052223jp.xxx | jp20130510335225113052223jp.xxxxxx |
| A4 | ... Latitude, ... Longitude | 10335225 | 11305223 | jp20130510335225113052223jp.xxx | jp20130510335225113052223jp.xxxxxx |
| Ag3 | ... Latitude, ... Longitude | 10333347 | 20842109 | us20130510333347208421109xxx | us20130510333347208421109xxxXXX U.S.A. |
| Ag4 | ... Latitude, ... Longitude | 10140623 | 11004318 | th20130510140623110043118xxx | th201305101···18xxxxxxThailand |
| B1 | ... Latitude, ... Longitude | 10353905 | 11394528 | jp20130510353905113945228yy | jp20130510353905113945228yyyy |
| B2 | ... Latitude, ... Longitude | 10353905 | 11394528 | jp20130510353905113945228yy | jp20130510353905113945228yyyy |
| B3 | ... Latitude, ... Longitude | 10353905 | 11394528 | jp20130510353905113945228yy | jp20130510353905113945228yyyy |
| Bg1 | ... Latitude, ... Longitude | 10353724 | 11394347 | jp20130510353724113943347yy | jp20130510353724113943347yyyytec |
| Bg2 | ... Latitude, ... Longitude | 10353724 | 11394347 | jp20130510353724113943347yy | jp20130510353724113943347yyyytec |
| Bg3 | ... Latitude, ... Longitude | 10353724 | 11394347 | jp20130510353724113943347yy | jp20130510353724113943347yyyytec |
| Bg4 | ... Latitude, ... Longitude | 10353724 | 11394347 | jp20130510353724113943347yy | jp20130510353724113943347yyyytec |
| C1 | ... Latitude, ... Longitude | 10353951 | 11394244 | jp20130510353951113942244zz | jp20130510353951113942244zzzz |
| C2 | ... Latitude, ... Longitude | 10353951 | 11394244 | jp20130510353951113942244zz | jp20130510353951113942244zzzz |
| C3 | ... Latitude, ... Longitude | 10353951 | 11394244 | jp20130510353951113942244zz | jp20130510353951113942244zzzz |
| C4 | ... Latitude, ... Longitude | 10353951 | 11394244 | jp20130510353951113942244zz | jp20130510353951113942244zzzz |
| C5 | ... Latitude, ... Longitude | 10353951 | 11394244 | jp20130510353951113942244zz | jp20130510353951113942244zzzz |
| C6 | ... Latitude, ... Longitude | 10353951 | 11394244 | jp20130510353951113942244zz | jp20130510353951113942244zzzz |

(51) Int. Cl.
  *H04L 12/58* (2006.01)
  *G06Q 20/10* (2012.01)
  *G06F 21/62* (2013.01)
(52) U.S. Cl.
  CPC .......... *G06Q 20/10* (2013.01); *G06Q 20/102* (2013.01); *H04L 51/20* (2013.01); *H04L 51/28* (2013.01)
(58) Field of Classification Search
  USPC .............. 705/34, 71, 44, 301, 26.1, 16, 41; 713/189, 178; 715/854; 726/9; 707/608
  See application file for complete search history.

(56) References Cited

U.S. PATENT DOCUMENTS

| | | | | |
|---|---|---|---|---|
| 2008/0028019 | A1* | 1/2008 | Philyaw | G06Q 20/208 709/202 |
| 2010/0082497 | A1* | 4/2010 | Biesemann | G06Q 10/06 705/301 |
| 2010/0153836 | A1* | 6/2010 | Krassner | H04L 67/36 715/234 |
| 2010/0223113 | A1* | 9/2010 | Lee | G06Q 30/02 705/14.4 |
| 2011/0282678 | A1 | 11/2011 | Chapman | |
| 2011/0307939 | A1* | 12/2011 | Okashita | G06F 21/6263 726/3 |
| 2012/0290482 | A1* | 11/2012 | Atef | G06F 21/31 705/44 |
| 2012/0327465 | A1* | 12/2012 | Yamada | G06F 21/305 358/1.15 |
| 2013/0218765 | A1* | 8/2013 | Hammad | G06Q 20/4016 705/41 |

FOREIGN PATENT DOCUMENTS

| | | |
|---|---|---|
| JP | 2005-537588 | 8/2005 |
| JP | 2013-8108 | 1/2013 |
| WO | 2010/090252 | 8/2010 |

OTHER PUBLICATIONS

Extended EPO Search Report in corresponding EPO application 14851092.8, dated Mar. 20, 2017.

* cited by examiner

21 USER INFORMATION REGISTRATION SCREEN    22 MONITOR

| COUNTRY NAME | JAPAN ▼ |
|---|---|
| EMAIL ADDRESS | 6rou.sato@jp.xxx.com |
| COMPANY NAME | xxx Co., Ltd. |
| ENGLISH COMPANY NAME | xxx |
| NAME | 6ro Sato |
| USER POSTAL CODE | ◯◯◯-0012 |
| USER LOCATION | ・・・, Nerima-ku, Tokyo |
| USER TELEPHONE NO. | 81+0120-xx-xxxx |
| USER FAX NO. | 81+0120-xx-xxxx |
| HEADQUARTERS POSTAL CODE | △△△-0086 |
| HEADQUARTERS LOCATION | ・・・, Kokurakita-ku, Kitakyushu-shi |
| COMPANY HP URL | http://www.xxx.co.jp/ |

SEND (21a)  CACEL (21b)

FIG. 4

| MANAGEMENT NO. | | USER INFORMATION | GENERATION INFORMATION |
|---|---|---|---|
| Ag1 | Subsidiary G of Company A | ... | ... |
| A1 | Company A | ... | ... |
| A2 | Company A | ... | ... |
| Ag2 | Subsidiary G of Company A | ... | ... |
| A3 | Company A | ... | ... |
| A4 | Company A | ... | ... |
| Ag3 | Subsidiary G of Company A | ... | ... |
| Ag4 | Subsidiary G of Company A | ... | ... |
| B1 | Company B | ... | ... |
| B2 | Company B | ... | ... |
| B3 | Company B | ... | ... |
| Bg1 | Subsidiary G of Company B | ... | ... |
| Bg2 | Subsidiary G of Company B | ... | ... |
| Bg3 | Subsidiary G of Company B | ... | ... |
| Bg4 | Subsidiary G of Company B | ... | ... |
| C1 | Company C | ... | ... |
| C2 | Company C | ... | ... |
| C3 | Company C | ... | ... |
| C4 | Company C | ... | ... |
| C5 | Company C | ... | ... |
| C6 | Company C | ... | ... |

USER INFORMATION MANAGEMENT TABLE T1
MANAGEMENT NUMBER SECTION D1
USER INFORMATION MANAGEMENT SECTION D2
GENERATION INFORMATION MANAGEMENT SECTION D3

D2 USER INFORMATION MANAGEMENT SECTION

| USER MANAGEMENT NO. | COUNTRY NAME | Email | COMPANY NAME | ENGLISH COMPANY NAME | NAME | POSTAL CODE | USER LOCATION |
|---|---|---|---|---|---|---|---|
| Ag1 | jp | 1rou.sato@jp.xxx.com | xxxfinace | xxx | 1ro Sato | 802-•••• | ... Kokurakita-ku, Kitakyushu-shi |
| A1 | jp | 2rou.sato@jp.xxx.com | xxx Co., Ltd. | xxx | 2ro Sato | 802-•••• | ... Kokurakita-ku, Kitakyushu-shi |
| A2 | jp | 3rou.sato@jp.xxx.com | xxx Co., Ltd. | xxx | 3ro Sato | 802-•••• | ... Kokurakita-ku, Kitakyushu-shi |
| Ag2 | jp | 4rou.sato@jp.xxx.com | xxx INFORM Co., Ltd. | xxx | 4ro Sato | 802-•••• | ... Kokurakita-ku, Kitakyushu-shi |
| A3 | jp | 5rou.sato@jp.xxx.com | xxx Co., Ltd., Tokyo branch | xxx | 5ro Sato | 151-•••• | ... Shibuya-ku, Tokyo |
| A4 | jp | 6rou.sato@jp.xxx.com | xxx Co., Ltd., Tokyo branch, Nerima sales branch | xxx | 6ro Sato | 176-•••• | ... Nerima-ku, Tokyo |
| Ag3 | us | 7rou.sato@xxx.us | xxx U.S.A,Inc. | xxx U.S.A | 7ro Sato |  | ..., GA 30260 U.S.A. |
| Ag4 | th | 8rou.sato@xxx.cn | xxx Thailand Co.,Ltd. | xxx Thailand | 8ro Sato |  | ... Thailand |
| B1 | jp | 1rou.suzuki@yy.com | yy Co., Ltd. | yy | 1ro Suzuki | 107-•••• | ... Minato-ku, Tokyo |
| B2 | jp | 2rou.suzuki@yy.com | yy Co., Ltd., Tohoku branch | yy | 2ro Suzuki | 980-•••• | ... Aoba-ku, Sendai-shi |
| B3 | jp | 3rou.suzuki@yy.com | yy Co., Ltd., Yamagata sales branch | yy | 3ro Suzuki | 990-•••• | ...Kosho-machi, Yamagata-shi |
| Bg1 | jp | 4rou.suzuki@yy.com | yy TECH Co., Ltd. | yytec | 4ro Suzuki | 141-•••• | ... Shinagawa-ku, Tokyo |
| Bg2 | jp | 5rou.suzuki@yy.com | yyTECH Co., Ltd., Tobu branch | yytec | 5ro Suzuki | 141-•••• | ... Shinagawa-ku, Tokyo |
| Bg3 | jp | 6rou.suzuki@yy.com | yyTECH Co., Ltd., Tobu branch | yytec | 6ro Suzuki | 169-•••• | ... Shinjuku-ku, Tokyo |
| Bg4 | jp | 7rou.suzuki@yy.com | yyTECH Co., Ltd., Tobu branch | yytec | 7ro Suzuki | 169-•••• | ... Shinjuku-ku, Tokyo |
| C1 | jp | 1rou.saito@zz.co.jp | zz Co., Ltd. | zz | 1ro Saito | 107-•••• | ... Minato-ku, Tokyo |
| C2 | jp | 2rou.saito@zz.co.jp | zz Co., Ltd. | zz | 2ro Saito | 107-•••• | ... Minato-ku, Tokyo |
| C3 | jp | 3rou.saito@zz.co.jp | zz Co., Ltd. | zz | 3ro Saito | 060-•••• | ...Sapporo-shi, Hokkaido |
| C4 | jp | 4rou.saito@zz.co.jp | zz Co., Ltd. | zz | 4ro Saito | 939-•••• | ...Toyama-shi, Toyama-ken |
| C5 | jp | 5rou.saito@zz.co.jp | zz Co., Ltd. | zz | 5ro Saito | 780-•••• | ... Kochi-shi, Kochi-ken |
| C6 | jp | 6rou.saito@zz.co.jp | zz Co., Ltd., Tottori branch | zz | 6ro Saito | 689-•••• | ... Tottori-shi, Tottori-ken |

| USER MANAGEMENT NO. | TEL | FAX | HEADQUARTERS POSTAL CODE | USER INFORMATION MANAGEMENT SECTION D2 ||| |
|---|---|---|---|---|---|---|
| | | | | HEADQUARTERS LOCATION | COMPANY HP URL | IN-HOUSE SHARER |
| Ag1 | ... | ... | 802-... | ... Kokurakita-ku, Kitakyushu-shi | http://www.xxx.co.jp/ | 2,3,4,5,6rou.sato@jp.xxx.com |
| A1 | ... | ... | 802-... | ... Kokurakita-ku, Kitakyushu-shi | http://www.xxx.co.jp/ | 3,5,6rou.sato@jp.xxx.com |
| A2 | ... | ... | 802-... | ... Kokurakita-ku, Kitakyushu-shi | http://www.xxx-group.jp/ | 1,2,3,5,6rou.sato@jp.xxx.com |
| Ag2 | ... | ... | 802-... | ... Kokurakita-ku, Kitakyushu-shi | http://www.xxx.co.jp/ | 6rou.sato@jp.xxx.com |
| A3 | ... | ... | 802-... | ... Kokurakita-ku, Kitakyushu-shi | http://www.xxx.co.jp/ | |
| A4 | ... | ... | | ..., GA 30260 U.S.A. | http://www.xxxusa.com/ | |
| Ag3 | ... | ... | | ... Thailand | – | ... |
| Ag4 | ... | ... | ... | ... Minato-ku, Tokyo | http://www.yy.co.jp/ | 2,3rou.suzuki@yy.co.jp |
| B1 | ... | ... | ... | ... Minato-ku, Tokyo | http://www.yy.co.jp/ | 3rou.suzuki@yy.co.jp |
| B2 | ... | ... | ... | ... Minato-ku, Tokyo | http://www.yy.co.jp/ | |
| B3 | ... | ... | ... | ... Shinagawa-ku, Tokyo | http://www.yytec.co.jp/ | 5rou.suzuki@yy.co.jp |
| Bg1 | ... | ... | ... | ... Shinagawa-ku, Tokyo | http://www.yytec.co.jp/ | 6rou.suzuki@yy.co.jp |
| Bg2 | ... | ... | ... | ... Shinagawa-ku, Tokyo | http://www.yytec.co.jp/ | |
| Bg3 | ... | ... | ... | ... Shinagawa-ku, Tokyo | http://www.yytec.co.jp/ | |
| Bg4 | ... | ... | ... | ... Minato-ku, Tokyo | http://www.zz.co.jp/ | 2,3,4rou.saito@zz.co.jp |
| C1 | ... | ... | ... | ... Minato-ku, Tokyo | http://www.zz.co.jp/ | 3,4,5rou.saito@zz.co.jp |
| C2 | ... | ... | ... | ... Minato-ku, Tokyo | http://www.zz.co.jp/ | |
| C3 | ... | ... | ... | ... Minato-ku, Tokyo | http://www.zz.co.jp/ | |
| C4 | ... | ... | ... | ... Minato-ku, Tokyo | http://www.zz.co.jp/ | |
| C5 | ... | ... | ... | ... Minato-ku, Tokyo | http://www.zz.co.jp/ | |
| C6 | ... | ... | ... | ... Minato-ku, Tokyo | http://www.zz.co.jp/ | |

D3 GENERATION INFORMATION MANAGEMENT SECTION

| USER MANAGE-MENT NO. | EMAIL DOMAIN | USER START YEAR-MONTH-DAY | USER CHANGE YEAR-MONTH-DAY | USER CHANGE YEAR-MONTH | USER LOCATION INFORMATION (WGS84) | USER LOCATION (LATITUDE) | USER LOCATION (LONGITUDE) |
|---|---|---|---|---|---|---|---|
| Ag1 | jp.xxx | 20130130 | 20130510 | 201305 | ... Latitude, ... Longitude | 10335225 | 11305233 |
| A1 | jp.xxx | 20130129 | 20130511 | 201305 | ... Latitude, ... Longitude | 10335225 | 11305233 |
| A2 | jp.xxx | 20130129 | 20130512 | 201305 | ... Latitude, ... Longitude | 10335225 | 11305233 |
| Ag2 | jp.xxx | 20130129 | 20130513 | 201305 | ... Latitude, ... Longitude | 10335225 | 11305233 |
| A3 | jp.xxx | 20130120 | 20130514 | 201305 | ... Latitude, ... Longitude | 10354111 | 11394158 |
| A4 | jp.xxx | 20130113 | 20130515 | 201305 | ... Latitude, ... Longitude | 10354404 | 11393950 |
| Ag3 | xxx | 20130122 | 20130516 | 201305 | ... Latitude, ... Longitude | 10333347 | 20842109 |
| Ag4 | xxx | 20130124 | 20130517 | 201305 | ... Latitude, ... Longitude | 10140623 | 11004318 |
| B1 | yy | 20130130 | 20130518 | 201305 | ... Latitude, ... Longitude | 10353905 | 11394528 |
| B2 | yy | 20130130 | 20130519 | 201305 | ... Latitude, ... Longitude | 10381548 | 11405238 |
| B3 | yy | 20130110 | 20130520 | 201305 | ... Latitude, ... Longitude | 10381452 | 11402034 |
| Bg1 | yy | 20130130 | 20130521 | 201305 | ... Latitude, ... Longitude | 10353724 | 11394347 |
| Bg2 | yy | 20130120 | 20130522 | 201305 | ... Latitude, ... Longitude | 10353724 | 11394347 |
| Bg3 | yy | 20130108 | 20130523 | 201305 | ... Latitude, ... Longitude | 10354215 | 11394230 |
| Bg4 | yy | 20130117 | 20130524 | 201305 | ... Latitude, ... Longitude | 10354215 | 11394230 |
| C1 | zz | 20130130 | 20130525 | 201305 | ... Latitude, ... Longitude | 10353951 | 11394244 |
| C2 | zz | 20130130 | 20130525 | 201305 | ... Latitude, ... Longitude | 10353951 | 11394244 |
| C3 | zz | 20130125 | 20130525 | 201305 | ... Latitude, ... Longitude | 10353951 | 11412160 |
| C4 | zz | 20130122 | 20130525 | 201305 | ... Latitude, ... Longitude | 10364028 | 11371212 |
| C5 | zz | 20130118 | 20130525 | 201305 | ... Latitude, ... Longitude | 10333443 | 11333255 |
| C6 | zz | 20130119 | 20130525 | 201305 | ... Latitude, ... Longitude | 10352637 | 11341556 |

FIG. 9

D3 GENERATION INFORMATION MANAGEMENT SECTION

| USER MANAGEMENT NO. | HEADQUARTERS LOCATION INFORMATION | HEADQUARTERS LOCATION (LATITUDE) | HEADQUARTERS LOCATION (LONGITUDE) | GENERAL-PURPOSE COMPANY GROUP CODE | GENERAL-PURPOSE COMPANY CODE |
|---|---|---|---|---|---|
| Ag1 | ... Latitude, ... Longitude | 10335225 | 11305223 | jp20130510335225111305223jp.xxx | jp20130510335225111305223jp.xxxxx |
| A1 | ... Latitude, ... Longitude | 10335225 | 11305223 | jp20130510335225111305223jp.xxx | jp20130510335225111305223jp.xxxxx |
| A2 | ... Latitude, ... Longitude | 10335225 | 11305223 | jp20130510335225111305223jp.xxx | jp20130510335225111305223jp.xxxxx |
| Ag2 | ... Latitude, ... Longitude | 10335225 | 11305223 | jp20130510335225111305223jp.xxx | jp20130510335225111305223jp.xxxxx |
| A3 | ... Latitude, ... Longitude | 10335225 | 11305223 | jp20130510335225111305223jp.xxx | jp20130510335225111305223jp.xxxxx |
| A4 | ... Latitude, ... Longitude | 10335225 | 11305223 | jp20130510335225111305223jp.xxx | jp20130510335225111305223jp.xxxxx |
| Ag3 | ... Latitude, ... Longitude | 10333347 | 20842109 | us20130510333347208421109xxx | us20130510333347208421109xxxXXX U.S.A. |
| Ag4 | ... Latitude, ... Longitude | 10140623 | 11004318 | th201305101014062311004318xxx | th201305101···18xxxxxThailand |
| B1 | ... Latitude, ... Longitude | 10353905 | 11394528 | jp20130510353905111394528yy | jp20130510353905111394528yyyy |
| B2 | ... Latitude, ... Longitude | 10353905 | 11394528 | jp20130510353905111394528yy | jp20130510353905111394528yyyy |
| B3 | ... Latitude, ... Longitude | 10353905 | 11394528 | jp20130510353905111394528yy | jp20130510353905111394528yyyy |
| Bg1 | ... Latitude, ... Longitude | 10353724 | 11394347 | jp20130510353724111394347yy | jp20130510353724111394347yyyytec |
| Bg2 | ... Latitude, ... Longitude | 10353724 | 11394347 | jp20130510353724111394347yy | jp20130510353724111394347yyyytec |
| Bg3 | ... Latitude, ... Longitude | 10353724 | 11394347 | jp20130510353724111394347yy | jp20130510353724111394347yyyytec |
| Bg4 | ... Latitude, ... Longitude | 10353724 | 11394347 | jp20130510353724111394347yy | jp20130510353724111394347yyyytec |
| C1 | ... Latitude, ... Longitude | 10353951 | 11394244 | jp20130510353951111394244zz | jp20130510353951111394244zzzz |
| C2 | ... Latitude, ... Longitude | 10353951 | 11394244 | jp20130510353951111394244zz | jp20130510353951111394244zzzz |
| C3 | ... Latitude, ... Longitude | 10353951 | 11394244 | jp20130510353951111394244zz | jp20130510353951111394244zzzz |
| C4 | ... Latitude, ... Longitude | 10353951 | 11394244 | jp20130510353951111394244zz | jp20130510353951111394244zzzz |
| C5 | ... Latitude, ... Longitude | 10353951 | 11394244 | jp20130510353951111394244zz | jp20130510353951111394244zzzz |
| C6 | ... Latitude, ... Longitude | 10353951 | 11394244 | jp20130510353951111394244zz | jp20130510353951111394244zzzz |

T2 INVOICE INFORMATION MANAGEMENT TABLE

| MANAGEMENT NO. | INVOICE INFORMATION NO. | INVOICE CONTACT | INVOICED PARTY | ADDRESS | INVOICE DETAILS | INVOICE AMOUNT | DESIGNATED TRANSFER ACCOUNT | DESIGNATED ACCOUNT NUMBER AND NAME |
|---|---|---|---|---|---|---|---|---|
| A4→Ag3 | BD1 | 7rou.sato@xxx.us | xxx U.S.A.,INC. | xxx U.S.A | Product A | ¥100 | M Bank, Ikebukuro branch | 1234567 xxx Co., Ltd |
| A4→B3 | BD2 | 3rou.suzuki@yy.com | yy Co., Ltd., Yamagata sales branch | yy | Product B | ¥101 | M Bank, Ikebukuro branch | 1234567 xxx Co., Ltd |
| A4→Bg4 | BD3 | 7rou.suzuki@yy.com | yyTECH Co., Ltd., Tobu branch | yytec | Product C | ¥102 | M Bank, Ikebukuro branch | 1234567 xxx Co., Ltd |
| A4→C3 | BD4 | 3rou.saito@zz.co.jp | zz Co., Ltd. | zz | Product D | ¥103 | M Bank, Ikebukuro branch | 1234567 xxx Co., Ltd |
| A4→C5 | BD5 | 5rou.saito@zz.co.jp | zz Co., Ltd. | zz | Product E | ¥104 | M Bank, Ikebukuro branch | 1234567 xxx Co., Ltd |
| A4→C6 | BD6 | 6rou.saito@zz.co.jp | zz Co., Ltd., Tottori branch | zz | Product F | ¥105 | M Bank, Ikebukuro branch | 1234567 xxx Co., Ltd |

FIG. 11

| MANAGEMENT NO. | INVOICE INFORMATION NO. | USER LOCATION INFORMATION (WGS84) | USER LOCATION (LATITUDE) | USER LOCATION (LONGITUDE) |
|---|---|---|---|---|
| A4→Ag3 | BD1 | ... Latitude, ... Longitude | 10333347 | 20842109 |
| A4→B3 | BD2 | ... Latitude, ... Longitude | 10381452 | 11402034 |
| A4→Bg4 | BD3 | ... Latitude, ... Longitude | 10354215 | 11394230 |
| A4→C3 | BD4 | ... Latitude, ... Longitude | 10353951 | 11412160 |
| A4→C5 | BD5 | ... Latitude, ... Longitude | 10333443 | 11333255 |
| A4→C6 | BD6 | ... Latitude, ... Longitude | 10352637 | 11341556 |

T2 INVOICE INFORMATION MANAGEMENT TABLE

FIG. 12

T3 INVOICING-PARTY USER INFORMATION MANAGEMENT TABLE

| USER MANAGEMENT NO. | COUNTRY NAME | Email | COMPANY NAME | ENGLISH COMPANY NAME | NAME | POSTAL CODE | USER LOCATION |
|---|---|---|---|---|---|---|---|
| A4 | jp | 6rou.sato@jp.xxx.com | xxx Co., Ltd., Tokyo branch, Nerima sales branch | xxx | 6ro Sato | 176-··· | ... Nerima-ku, Tokyo |
| A4 | jp | 6rou.sato@jp.xxx.com | xxx Co., Ltd., Tokyo branch, Nerima sales branch | xxx | 6ro Sato | 176-··· | ... Nerima-ku, Tokyo |
| A4 | jp | 6rou.sato@jp.xxx.com | xxx Co., Ltd., Tokyo branch, Nerima sales branch | xxx | 6ro Sato | 176-··· | ... Nerima-ku, Tokyo |
| A4 | jp | 6rou.sato@jp.xxx.com | xxx Co., Ltd., Tokyo branch, Nerima sales branch | xxx | 6ro Sato | 176-··· | ... Nerima-ku, Tokyo |
| A4 | jp | 6rou.sato@jp.xxx.com | xxx Co., Ltd., Tokyo branch, Nerima sales branch | xxx | 6ro Sato | 176-··· | ... Nerima-ku, Tokyo |
| A4 | jp | 6rou.sato@jp.xxx.com | xxx Co., Ltd., Tokyo branch, Nerima sales branch | xxx | 6ro Sato | 176-··· | ... Nerima-ku, Tokyo |

FIG. 13

| USER MANAGEMENT NO. | TEL | FAX | HEADQUARTERS POSTAL CODE | HEADQUARTERS LOCATION | COMPANY HP URL | IN-HOUSE SHARER |
|---|---|---|---|---|---|---|
| A4 | ... | ... | 802-... | Kokurakita-ku, Kitakyushu-shi, ... | http://www.xxx.co.jp/ | |
| A4 | ... | ... | 802-... | Kokurakita-ku, Kitakyushu-shi, ... | http://www.xxx.co.jp/ | |
| A4 | ... | ... | 802-... | Kokurakita-ku, Kitakyushu-shi, ... | http://www.xxx.co.jp/ | |
| A4 | ... | ... | 802-... | Kokurakita-ku, Kitakyushu-shi, ... | http://www.xxx.co.jp/ | |
| A4 | ... | ... | 802-... | Kokurakita-ku, Kitakyushu-shi, ... | http://www.xxx.co.jp/ | |
| A4 | | | | Kokurakita-ku, Kitakyushu-shi, ... | | |

T3 INVOICING-PARTY USER INFORMATION MANAGEMENT TABLE

FIG. 14

T3 INVOICING-PARTY USER INFORMATION MANAGEMENT TABLE

| USER MANAGE-MENT NO. | EMAIL DOMAIN | USER START YEAR-MONTH-DAY | USER CHANGE YEAR-MONTH-DAY | USER CHANGE YEAR-MONTH | USER LOCATION INFORMATION (WGS84) | USER LOCATION (LATITUDE) | USER LOCATION (LONGITUDE) |
|---|---|---|---|---|---|---|---|
| A4 | jp.xxx | 20130113 | 20130515 | 201305 | ... Latitude, ... Longitude | 10354404 | 11393950 |
| A4 | jp.xxx | 20130113 | 20130515 | 201305 | ... Latitude, ... Longitude | 10354404 | 11393950 |
| A4 | jp.xxx | 20130113 | 20130515 | 201305 | ... Latitude, ... Longitude | 10354404 | 11393950 |
| A4 | jp.xxx | 20130113 | 20130515 | 201305 | ... Latitude, ... Longitude | 10354404 | 11393950 |
| A4 | jp.xxx | 20130113 | 20130515 | 201305 | ... Latitude, ... Longitude | 10354404 | 11393950 |
| A4 | jp.xxx | 20130113 | 20130515 | 201305 | ... Latitude, ... Longitude | 10354404 | 11393950 |

T3 INVOICING-PARTY USER INFORMATION MANAGEMENT TABLE

| USER MANAGEMENT NO. | HEADQUARTERS LOCATION INFORMATION | HEADQUARTERS LOCATION (LATITUDE) | HEADQUARTERS LOCATION (LONGITUDE) | GENERAL-PURPOSE COMPANY GROUP CODE | GENERAL-PURPOSE COMPANY CODE |
|---|---|---|---|---|---|
| A4 | ... Latitude, ... Longitude | 10335225 | 11305223 | jp20130510335225113052 23jp.xxx | jp20130510335225113052 23jp.xxxxxx |
| A4 | ... Latitude, ... Longitude | 10335225 | 11305223 | jp20130510335225113052 23jp.xxx | jp20130510335225113052 23jp.xxxxxx |
| A4 | ... Latitude, ... Longitude | 10335225 | 11305223 | jp20130510335225113052 23jp.xxx | jp20130510335225113052 23jp.xxxxxx |
| A4 | ... Latitude, ... Longitude | 10335225 | 11305223 | jp20130510335225113052 23jp.xxx | jp20130510335225113052 23jp.xxxxxx |
| A4 | ... Latitude, ... Longitude | 10335225 | 11305223 | jp20130510335225113052 23jp.xxx | jp20130510335225113052 23jp.xxxxxx |

T4 INVOICED-PARTY USER INFORMATION MANAGEMENT TABLE

| USER MANAGEMENT NO. | COUNTRY NAME | Email | COMPANY NAME | ENGLISH COMPANY NAME | NAME | POSTAL CODE | USER LOCATION |
|---|---|---|---|---|---|---|---|
| Ag3 | us | 7rou.sato@xxx.us | xxx U.S.A,INC. | xxx U.S.A | 7ro Sato | | ..., GA 30260 U.S.A. |
| B3 | jp | 3rou.suzuki@yy.com | yy Co., Ltd., Yamagata sales branch | yy | 3ro Suzuki | 990-... | ..., Kosho-machi, Yamagata-ken |
| Bg4 | jp | 7rou.suzuki@yy.com | yyTECH Co., Ltd., Tobu branch | yytec | 7ro Suzuki | 169-... | ..., Shinjuku-ku, Tokyo |
| C3 | jp | 3rou.saito@zz.co.jp | zz Co., Ltd. | zz | 3ro Saito | 060-... | ... Sapporo-shi, Hokkaido |
| C5 | jp | 5rou.saito@zz.co.jp | zz Co., Ltd. | zz | 5ro Saito | 780-... | ..., Kochi-shi, Kochi-ken |
| C6 | jp | 6rou.saito@zz.co.jp | zz Co., Ltd., Tottori branch | zz | 6ro Saito | 689-... | ..., Tottori-shi, Tottori-ken |

FIG. 17

T4 INVOICED-PARTY USER INFORMATION MANAGEMENT TABLE

| USER MANAGE-MENT NO. | TEL | FAX | HEADQUARTERS POSTAL CODE | HEADQUARTERS LOCATION | COMPANY HP URL | IN-HOUSE SHARER |
|---|---|---|---|---|---|---|
| Ag3 | ... | ... | | ... GA 30260 U.S.A. | http://www.xxxusa.com/ | |
| B3 | ... | ... | ... | ... Minato-ku, Tokyo | http://www.yy.co.jp/ | |
| Bg4 | ... | ... | ... | ... Shinagawa-ku, Tokyo | http://www.yytec.co.jp/ | |
| C3 | ... | ... | ... | ... Minato-ku, Tokyo | http://www.zz.co.jp/ | |
| C5 | ... | ... | ... | ... Minato-ku, Tokyo | http://www.zz.co.jp/ | |
| C6 | ... | ... | | ... Minato-ku, Tokyo | http://www.zz.co.jp/ | |

FIG. 18

T4 INVOICED-PARTY USER INFORMATION MANAGEMENT TABLE

| USER MANAGE-MENT NO. | EMAIL DOMAIN | USER START YEAR-MONTH-DAY | USER CHANGE YEAR-MONTH-DAY | USER CHANGE YEAR-MONTH | USER LOCATION INFORMATION (WGS84) | USER LOCATION (LATITUDE) | USER LOCATION (LONGITUDE) |
|---|---|---|---|---|---|---|---|
| Ag3 | xxx | 20130122 | 20130516 | 201305 | ... Latitude, ... Longitude | 10333347 | 20842109 |
| B3 | yy | 20130110 | 20130520 | 201305 | ... Latitude, ... Longitude | 10381452 | 11402034 |
| Bg4 | yy | 20130117 | 20130524 | 201305 | ... Latitude, ... Longitude | 10354215 | 11394230 |
| C3 | zz | 20130125 | 20130525 | 201305 | ... Latitude, ... Longitude | 10353951 | 11412160 |
| C5 | zz | 20130118 | 20130525 | 201305 | ... Latitude, ... Longitude | 10333443 | 11333255 |
| C6 | zz | 20130119 | 20130525 | 201305 | ... Latitude, ... Longitude | 10352637 | 11341556 |

FIG. 19

T4 INVOICED-PARTY USER INFORMATION MANAGEMENT TABLE

| USER MANAGEMENT NO. | HEADQUARTERS LOCATION INFORMATION | HEADQUARTERS LOCATION (LATITUDE) | HEADQUARTERS LOCATION (LONGITUDE) | GENERAL-PURPOSE COMPANY GROUP CODE | GENERAL-PURPOSE COMPANY CODE |
|---|---|---|---|---|---|
| Ag3 | ... Latitude, ... Longitude | 10333347 | 20842109 | us20130510333347208421 09xxx | us20130510333347208421 09xxxXXX U.S.A. |
| B3 | ... Latitude, ... Longitude | 10353905 | 11394528 | jp20130510353905111394 528yy | jp20130510353905111394 528yyyy |
| Bg4 | ... Latitude, ... Longitude | 10353724 | 11394347 | jp20130510353724111394 347yy | jp20130510353724111394 347yyyytec |
| C3 | ... Latitude, ... Longitude | 10353951 | 11394244 | jp20130510353951111394 244zz | jp20130510353951111394 244zzzz |
| C5 | ... Latitude, ... Longitude | 10353951 | 11394244 | jp20130510353951111394 244zz | jp20130510353951111394 244zzzz |
| C6 | ... Latitude, ... Longitude | 10353951 | 11394244 | jp20130510353951111394 244zz | jp20130510353951111394 244zzzz |

| USER MANAGEMENT NO. | COUNTRY NAME | COMPANY NAME | ENGLISH COMPANY NAME | USER LOCATION | | HEADQUARTERS POSTAL CODE | HEADQUARTERS LOCATION | COMPANY HP URL | IN-HOUSE SHARER |
|---|---|---|---|---|---|---|---|---|---|
| | | | | NAME | POSTAL CODE | TEL | FAX | | |
| C2 | jp | Email | ... | ... | ... | ... | ... | ... | ... | 3,4,5,6rou.saito@zz.co.jp |

USER INFORMATION MANAGEMENT SECTION D2

FIG. 31

| USER MANAGEMENT NO. | COUNTRY NAME | USER INFORMATION MANAGEMENT SECTION D2 | | COMPANY NO. | | | | |
|---|---|---|---|---|---|---|---|---|
| | | Email | COMPANY NAME | | NAME | POSTAL CODE | USER LOCATION | |
| Ag1 | jp | 1rou.sato@jp.xxx.com | xxxfinace | ... | 1ro Sato | 802-... | ...Kokurakita-ku, Kitakyushu-shi | |
| A1 | jp | 2rou.sato@jp.xxx.com | xxx Co., Ltd. | ... | 2ro Sato | 802-... | ...Kokurakita-ku, Kitakyushu-shi | |
| A2 | jp | 3rou.sato@jp.xxx.com | xxx Co., Ltd. | ... | 3ro Sato | 802-... | ...Kokurakita-ku, Kitakyushu-shi | |
| Ag2 | jp | 4rou.sato@jp.xxx.com | xxx INFORM Co., Ltd. | ... | 4ro Sato | 802-... | ...Kokurakita-ku, Kitakyushu-shi | |
| A3 | jp | 5rou.sato@jp.xxx.com | xxx Co., Ltd. Tokyo branch | ... | 5ro Sato | 151-... | ...Shibuya-ku, Tokyo | |
| A4 | jp | 6rou.sato@jp.xxx.com | xxx Co., Ltd., Tokyo branch, Nerima sales branch | ... | 6ro Sato | 176-... | ...Nerima-ku, Tokyo | |
| Ag3 | us | 7rou.sato@xxx.us | xxx U.S.A.INC. | ... | 7ro Sato | | ...,GA 30260 U.S.A. | |
| Ag4 | th | 8rou.sato@jp.xxx.cn | xxx Thailand Co.,Ltd. | ... | 8ro Sato | | ...Thailand | |
| B1 | jp | 1rou.suzuki@yy.com | yy Co., Ltd. | ... | 1ro Suzuki | 107-... | ...Minato-ku, Tokyo | |
| B2 | jp | 2rou.suzuki@yy.com | yy Co., Ltd., Tohoku branch | ... | 2ro Suzuki | 980-... | ...Aoba-ku, Sendai-shi | |
| B3 | jp | 3rou.suzuki@yy.com | yy Co., Ltd. Yamagata sales branch | ... | 3ro Suzuki | 990-... | ...Kosho-machi, Yamagata-shi | |
| Bg1 | jp | 4rou.suzuki@yy.com | yy TECH Co., Ltd. | ... | 4ro Suzuki | 141-... | ...Shinagawa-ku, Tokyo | |
| Bg2 | jp | 5rou.suzuki@yy.com | yyTECH Co., Ltd., Tobu branch | ... | 5ro Suzuki | 141-... | ...Shinagawa-ku, Tokyo | |
| Bg3 | jp | 6rou.suzuki@yy.com | yyTECH Co., Ltd., Tobu branch | ... | 6ro Suzuki | 169-... | ...Shinjuku-ku, Tokyo | |
| Bg4 | jp | 7rou.suzuki@yy.com | yyTECH Co., Ltd., Tobu branch | ... | 7ro Suzuki | 169-... | ...Shinjuku-ku, Tokyo | |
| C1 | jp | 1rou.saito@zz.co.jp | zz Co., Ltd. | ... | 1ro Saito | 107-... | ...Minato-ku, Tokyo | |
| C2 | jp | 2rou.saito@zz.co.jp | zz Co., Ltd. | ... | 2ro Saito | 107-... | ...Minato-ku, Tokyo | |
| C3 | jp | 3rou.saito@zz.co.jp | zz Co., Ltd. | ... | 3ro Saito | 060-... | ...Sapporo-shi, Hokkaido | |
| C4 | jp | 4rou.saito@zz.co.jp | zz Co., Ltd. | ... | 4ro Saito | 939-... | ...Toyama-shi, Toyama-ken | |
| C5 | jp | 5rou.saito@zz.co.jp | zz Co., Ltd. | ... | 5ro Saito | 780-... | ...Kochi-shi, Kochi-ken | |
| C6 | jp | 6rou.saito@zz.co.jp | zz Co., Ltd., Tottori branch | ... | 6ro Saito | 689-... | ...Tottori-shi, Tottori-ken | |

US 10,762,541 B2

DEVICES AND METHODS FOR INFORMATION PROCESSING AND ACCESS CONTROL

RELATED APPLICATIONS

This application claims priority under 35 U.S.C. § 120 to, and is a continuation of, co-pending International Application PCT/JP2014/073268, filed on Sep. 3, 2014 and designating the US, which claims priority to Japanese Application 2013-206122 filed Oct. 1, 2013. These Japanese and International applications are incorporated by reference herein in their entirety.

BACKGROUND

There has been known a system for managing invoices in a unified way. For example, there is a known method for compiling electronic invoices issued to each recipient and calculating a total amount.

Please see, for example, Japanese Laid-open Patent Publication Nos. 2005-537588 and 2003-187159, incorporated herein in their entirety.

SUMMARY

According to one aspect, there is provided an information processing apparatus including: a first storage unit that is configured to store user information associating, for each individual user, user identification information identifying said each individual user with at least one unique information piece; a generation unit that is configured to generate a code for said each individual user using the at least one unique information piece and the user identification information, which are stored in the first storage unit, according to a predetermined rule; a second storage unit that is configured to store business document information including the user identification information of a first user included in the user information stored in the first storage unit; and a processing unit that is configured to determine, upon receiving an access request for accessing the business document information from a second user whose user information is stored in the first storage unit, whether a first code of the first user matches a second code of the second user, and granting, when the first code and the second code match, the second user access rights to access business document information generated by the first user and stored in the second storage unit.

BRIEF DESCRIPTION OF DRAWINGS

Example embodiments will become more apparent by describing, in detail, the attached drawings, wherein like elements are represented by like reference numerals, which are given by way of illustration only and thus do not limit the example embodiments herein.

FIG. 4 illustrates an example of a screen where user information is entered.

FIG. 5 illustrates an example of information that is stored in a user information storage unit.

FIG. 6 illustrates an example of information that is set in a user information management section.

FIG. 7 illustrates the example of the information that is set in the user information management section.

FIG. 8 illustrates an example of information that is set in a generation information management section.

FIG. 9 illustrates the example of the information that is set in the generation information management section.

FIG. 11 illustrates an example of information that is stored in an invoice information storage unit.

FIG. 12 illustrates the example of the information that is stored in the invoice information storage unit.

FIG. 13 is a view for explaining associations of the user information of an invoicing party and the user information of invoiced parties.

FIG. 14 is a view for explaining the associations of the user information of the invoicing party and the user information of the invoiced parties.

FIG. 15 is a view for explaining the associations of the user information of the invoicing party and the user information of the invoiced parties.

FIG. 16 is a view for explaining the associations of the user information of the invoicing party and the user information of the invoiced parties.

FIG. 17 is a view for explaining the associations of the user information of the invoicing party and the user information of the invoiced parties.

FIG. 18 is a view for explaining the associations of the user information of the invoicing party and the user information of the invoiced parties.

FIG. 19 is a view for explaining the associations of the user information of the invoicing party and the user information of the invoiced parties.

FIG. 20 is a view for explaining the associations of the user information of the invoicing party and the user information of the invoiced parties.

FIG. 22 is a view for explaining how to register sharers.

FIG. 31 illustrates an example of information that is set in a user information management section according to a second embodiment.

DETAILED DESCRIPTION

Figure 1:
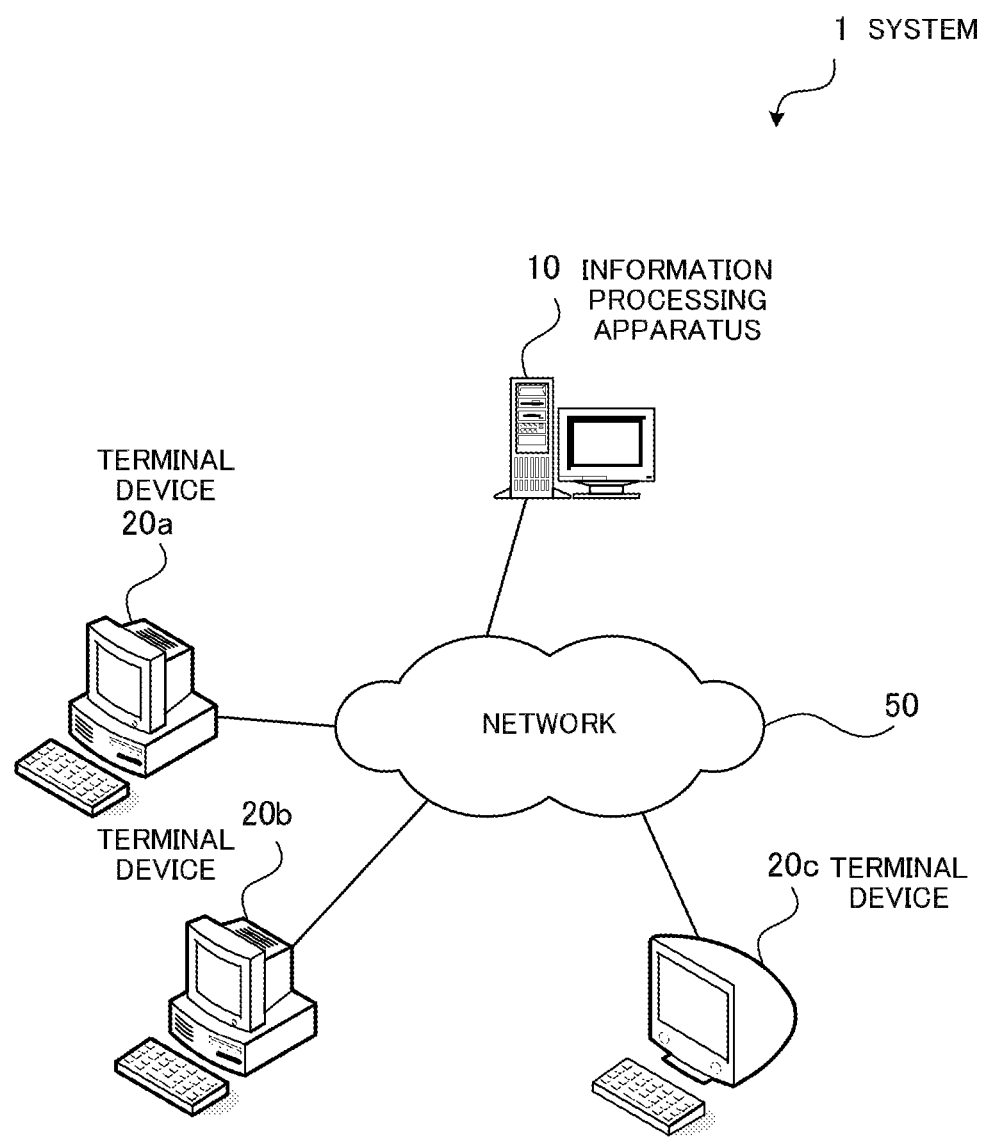
FIG. 1 illustrates a configuration of a system according to a first embodiment.

This is a patent document, and general broad rules of construction should be applied when reading it. Everything described and shown in this document is an example of subject matter falling within the scope of the claims, appended below. Any specific structural and functional details disclosed herein are merely for purposes of describing how to make and use example embodiments. Several different embodiments not specifically disclosed herein may fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when element(s) are referred to in relation to one another, such as being "connected," "coupled," "mated," "attached," or "fixed" to another element(s), the relationship can be direct or with other intervening elements. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). Similarly, a term such as "connected" for communications purposes includes all variations of information exchange routes between two devices, including intermediary devices, networks, etc., connected wirelessly or not.

As used herein, the singular forms "a", "an," and the are intended to include both the singular and plural forms, unless the language explicitly indicates otherwise with terms like "only a single element." It will be further understood that the terms "comprises", "comprising," "includes," and/or "including," when used herein, specify the presence of stated features, values, steps, operations, elements, and/or components, but do not themselves preclude the presence or addition of one or more other features, values, steps, operations, elements, components, and/or groups thereof.

It should also be noted that the structures and operations discussed below may occur out of the order described and/or noted in the figures. For example, two operations and/or figures shown in succession may in fact be executed concurrently or may be executed in the reverse order, depending upon the functionality/acts involved. Similarly, individual operations within example methods described below may be executed repetitively, individually or sequentially, so as to provide looping or other series of operations. It should be presumed that any embodiment having features and functionality described below, in any workable combination, falls within the scope of example embodiments.

The Inventor has recognized that for subsidiary companies owned by the same parent company and for a parent company and its subsidiary companies, it may be difficult to compile and manage, in a unified way, invoices that users geographically located at different places receive from a variety of clients. Further, even for one company, it may be difficult to compile and manage, in a unified way, invoices that users working at sales branches, branch offices, or factories situated geographically in different locations receive. The same problem may apply to invoices, as described above, as well as other commercial documents (hereinafter, business documents) that are communicated using computers. Example embodiments discussed below uniquely enable solutions to these and other input device problems newly recognized by the Inventor.

The present invention is specially configured computers for and methods of creating and operating the same for management of computerized resources across several users in varied physical networking configurations. In contrast to the present invention, the few example embodiments and example methods discussed below illustrate just a subset of the variety of different configurations that can be used as and/or in connection with the present invention.

First Embodiment

FIG. 1 illustrates a configuration of a system according to a first embodiment. In a system 1, an information processing apparatus 10 and terminal devices 20*a*, 20*b*, and 20*c* are connected over a network 50, such as the Internet.

The information processing apparatus 10 and terminal devices 20*a*, 20*b*, and 20*c* each runs a Web application. The terminal devices 20*a*, 20*b*, and 20*c* each communicate data on invoices with the information processing apparatus 10 via a Web browser. In this connection, this embodiment describes an example of communicating data on invoices. Since invoices are an example of business documents, the embodiment is not limited to the communication of invoices. Other examples of business documents include quotations and purchase orders, for example.

The terminal devices 20*a*, 20*b*, and 20*c* are operated by users (for example, people in accounting) who receive and issue invoices.

For example, the terminal device 20*a* is operated by a user of a company A, and the terminal device 20*b* is operated by a user of a company B (different from the company A). The terminal device 20*c* is operated by a user of a company Ag that is a group subsidiary of the company A.

Each user of the companies A, B, and Ag makes user registration with the information processing apparatus 10 using an Email address or the like assigned to the user, so as to set up an environment for accessing an invoice processing system provided by the information processing apparatus 10.

After that, when issuing an invoice from the company A to the company B, the user of the company A operates the terminal device 20*a* to generate information about the invoice (invoice information). The invoice information generated on the terminal device 20*a* is temporarily stored in the information processing apparatus 10. Then, in response to an access request for accessing the invoice from the terminal device 20*b* operated by the user of the company B, the information processing apparatus 10 makes the invoice information generated by the user of the company A viewable from the terminal device 20*b*.

In addition, when the user of the company Ag, which is a subsidiary of the company A, issues an invoice to the company B, the information processing apparatus 10 is able to make the invoice issued by the company Ag viewable by the user of the company A. This process will be described in detail later as a sharer registration process.

Further, the information processing apparatus 10 has a function that enables the company B to make one lump payment for the invoices issued by the company A and the company Ag. The information processing apparatus 10 also has a function of depositing the amount paid in a lump by the company B, into the individual accounts of the companies A and Ag.

The following describes specific functions of the information processing apparatus 10.

Figure 2:
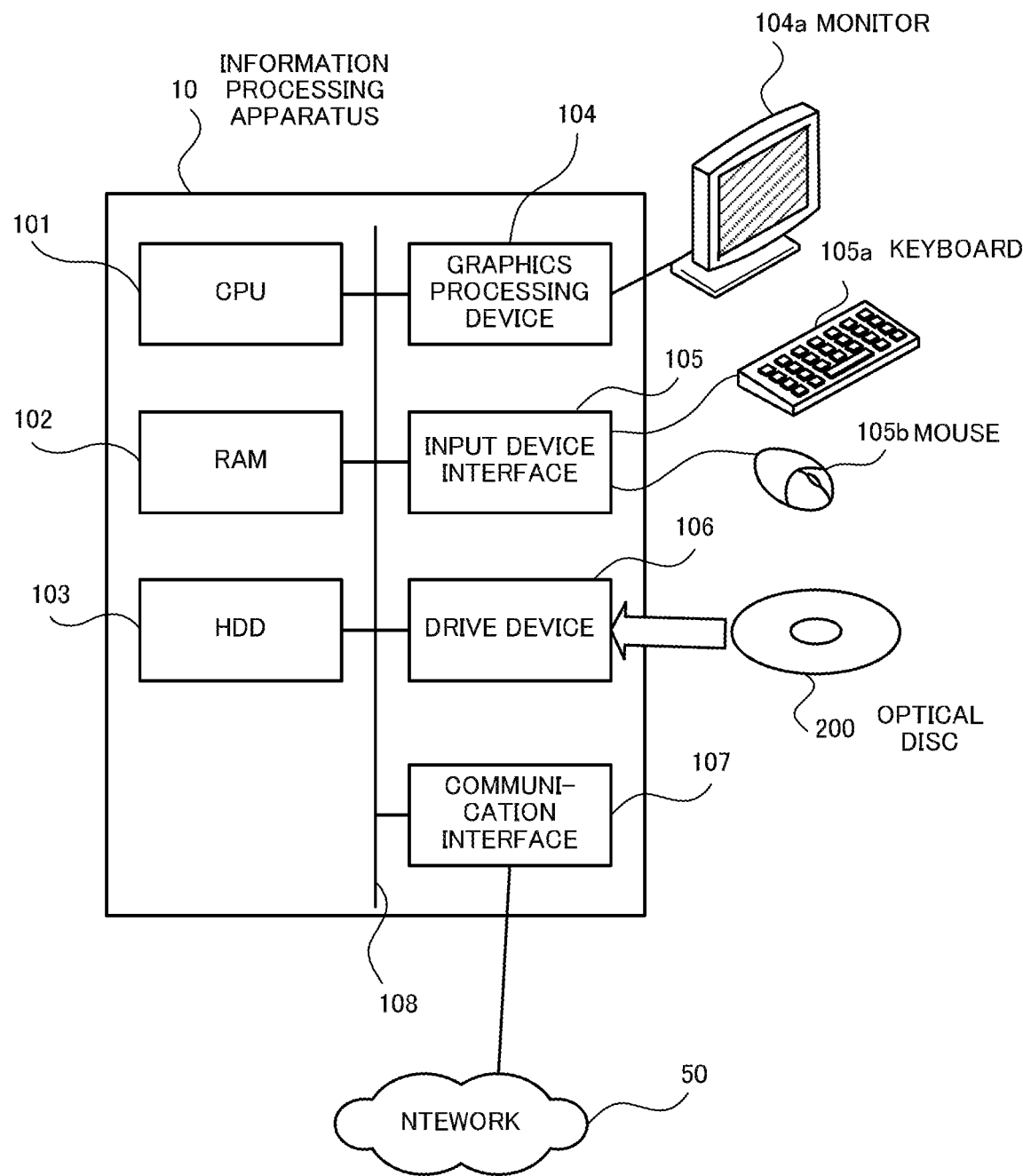
FIG. 2 illustrates a hardware configuration of an information processing apparatus according to the embodiment.

FIG. 2 illustrates a hardware configuration of an information processing apparatus according to the embodiment.

The information processing apparatus 10 is entirely controlled by a CPU (Central Processing Unit) 101. To the CPU 101, a RAM (Random Access Memory) 102 and a plurality of peripheral devices are connected with a bus 108.

The RAM 102 is used as a primary storage device of the information processing apparatus 10. The RAM 102 temporarily stores at least part of OS (Operating System) programs and application programs that are executed by the CPU 101. The RAM 102 also stores various data that is used while the CPU 101 operates.

Connected to the bus 108 are an HDD (Hard Disk Drive) 103, a graphics processing device 104, an input device interface 105, a drive device 106, and a communication interface 107.

The HDD 103 magnetically writes and reads data on a built-in disk. The HDD 103 is used as a secondary storage device of the information processing apparatus 10. The HDD 103 stores the OS programs, application programs, and various data. As a secondary storage device, a flash memory or another semiconductor storage device may be used.

A monitor 104a is connected to the graphics processing device 104. The graphics processing device 104 displays images on the screen of the monitor 104a in accordance with instructions from the CPU 101. As the monitor 104a, a display device using CRT (Cathode Ray Tube), a liquid crystal display device, or another may be used.

A keyboard 105a and a mouse 105b are connected to the input device interface 105. The input device interface 105 gives the CPU 101 signals received from the keyboard 105a and mouse 105b. The mouse 105b is one example of pointing devices, and another pointing device may be used. Other pointing devices include, for example, a touch panel, a tablet, a touchpad, a track ball, and others.

The drive device 106 reads data from optical discs, on which data is recorded such as to be read with reflection of light, USB (Universal Serial Bus) memories, or other portable recording media. For example, in the case where the drive device 106 is an optical drive device, the drive device 106 reads data from an optical disc 200 with laser light or the like. Optical discs 200 include Blu-ray (registered trademark), DVD (Digital Versatile Disc), DVD-RAM, CD-ROM (Compact Disc Read Only Memory), CD-R (Readable), and CD-RW (ReWritable).

The communication interface 107 is connected to the network 50. The communication interface 107 communicates data with another computer or communication device over the network 50.

With the above hardware configuration, the processing functions of the embodiment may be implemented. In this connection, FIG. 2 illustrates the hardware configuration of the information processing apparatus 10, and the terminal devices 20a, 20b, and 20c may be configured with the same hardware as the information processing apparatus 10.

The information processing apparatus 10 is provided with the following functions. Such functions in example embodiment may relate to or use a computer storage with a computer readable storage medium having computer code thereon for performing various computer-implemented operations. The media and computer code may be those specially designed and constructed for the purposes of example embodiments, or they may be conventional but physically configured with non-conventional functional code on computer-readable media executed by a computer processor. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Other embodiments may be implemented in hardwired circuitry in place of, or in combination with, machine-executable software instructions.

Figure 3:
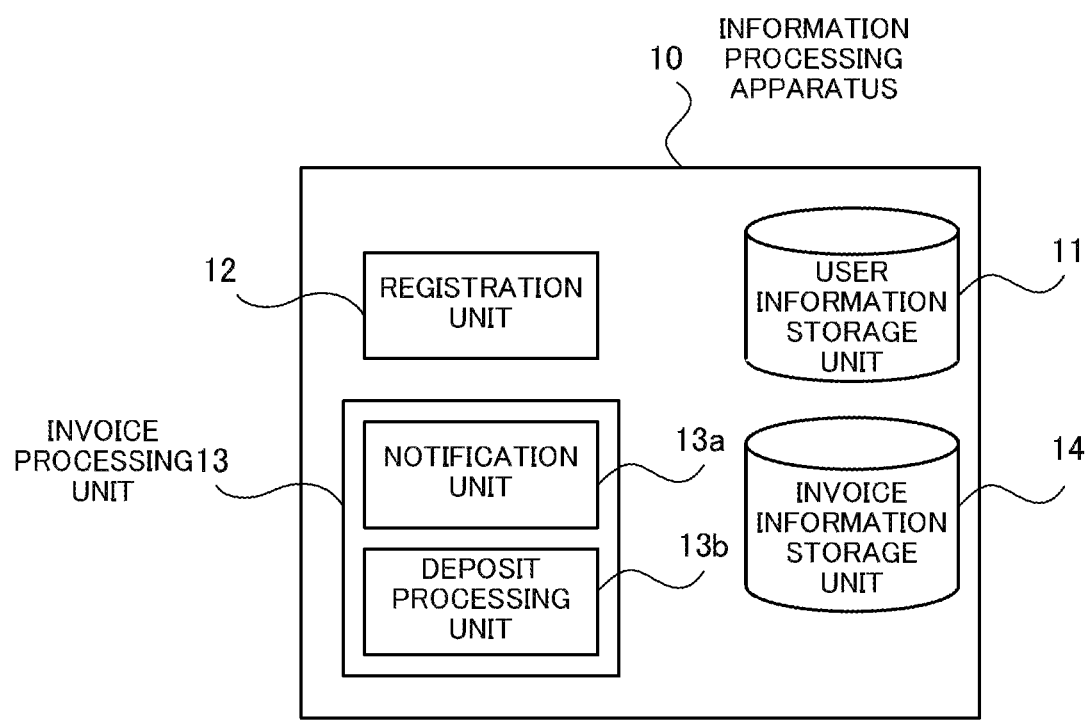
FIG. 3 is a block diagram illustrating functions of the information processing apparatus according to the embodiment.

FIG. 3 is a block diagram illustrating functions of an information processing apparatus according to the embodiment.

The information processing apparatus 10 includes a user information storage unit 11, a registration unit 12, an invoice processing unit 13, and an invoice information storage unit 14.

The user information storage unit 11 stores user information generated by the terminal devices 20a, 20b, and 20c.

The registration unit 12 stores information (user information) registered by a user in the user information storage unit 11. This user information is used in handling invoices.

The invoice information storage unit 14 stores invoice information generated by the terminal devices 20a, 20b, and 20c.

The invoice processing unit 13 includes a notification unit 13a and a deposit processing unit 13b.

The notification unit 13a identifies a user that has sent invoice information, on the basis of the invoice information stored in the invoice information storage unit 14. In addition, the notification unit 13a compiles invoice information issued from companies (including the parent company) owned by the same parent company. Then, the notification unit 13a notifies each invoiced party of the invoices issued thereto from the companies owned by the same parent company. In addition, the notification unit 13a notifies each invoiced party of the total amount of the invoices (the total amount) issued thereto from the companies owned by the same parent company.

In this connection, which invoices to compile are not limited thereto, and invoices issued from only the same company (from the parent company and from each subsidiary company separately) may be compiled.

The deposit processing unit 13b executes a process of dividing and depositing the total amount paid from a user of each invoiced party to an account, according to the amounts indicated on invoices, among the parent company and subsidiary companies. The following describes an example of information that is stored in the user information storage unit 11.

FIG. 4 illustrates an example of a screen where user information is entered. A user information registration screen 21 illustrated in FIG. 4 is displayed on the monitor 22 connected to the terminal device 20a, for example. The user information registration screen 21 has a SEND button 21a and a CANCEL button 21b.

The user information registration screen 21 has fields for entering the following information: Country Name, Email Address, Company Name, English Company Name, Name, User Postal Code, User Location, User Telephone Number (No.), User Fax No., Headquarters Postal Code, Headquarters Location, and Company HP URL.

In the Country Name field, information identifying a country where the company a user (simply referred to as a user in the explanation of FIG. 4) who enters user information works for is located is selected.

In the Email Address field, an Email address given to the user in the company is entered.

In the Company Name field, the name of the company the user works for is entered in Japanese.

In the English Company Name field, the name of the company the user works for is entered in English.

In the Name field, the user's name is entered.

In the User Postal Code field, the postal code of the company (for example, the postal code of the headquarters, branch office, or sales branch the user works for) the user works for is entered.

In the User Location field, the location of the company the user works for is entered.

In the User Telephone Number field, a user-desired contact telephone number is entered.

In the User Fax Number field, a user-desired contact facsimile number is entered.

In the Headquarters Postal Code field, the postal code of the headquarters of the company the user works for is entered.

In the Headquarters Location field, the location of the headquarters of the company the user works for is entered.

In the Company HP URL field, a homepage URL (Uniform Resource Locator) of the company is entered.

Although not illustrated in FIG. 4, other fields may be provided for entering the name of a section which the user belongs to in the company, an employee code, the name of a representative section responsible for cost, and a representative account item.

In response to the user pressing the SEND button 21a, the terminal device 20a sends the user information to the information processing apparatus 10

FIG. 5 illustrates an example of information that is stored in a user information storage unit.

In this embodiment, user information is stored in tabular form. A user information management table T1 illustrated in FIG. 5 includes a management number section D1 for storing management numbers, a user information management section D2 for storing user information, and a generation information management section D3 for storing generation information. Out of these, the generation information is information that is generated on the basis of the user information by the registration unit 12. The information pieces in these three sections are associated with each other to form a record, which is assigned a serial number. Each record is identified by a serial number.

The management number section D1 contains numbers for managing the user information. For example, it is recognized from FIG. 5 that a user with user management number Ag1 belongs to a group company of the company A. User management numbers are assigned by the registration unit 12 on the basis of the headquarters location, domain, and others included in the user information so that no overlapping user management numbers are assigned.

FIGS. 6 and 7 illustrate an example of information that is set in a user information management section.

The user information management section D2 has fields for the following information: User Management Number, Country Name, Email, Company Name, English Company Name, Name, Postal Code, User Location, Telephone Number (TEL), Facsimile Number (Fax), Headquarters Postal Code, Headquarters Location, Company HP URL, and In-House Sharer.

In the fields of the user information management section D2 with field names having the same meaning as those of the user information registration screen 21 of FIG. 4, information entered by a user on the user information registration screen 21 is registered. Therefore, these fields will not be described again.

The In-House Sharer field contains the Email addresses of users that are permitted to access invoices that are created by a user with a corresponding user management number and are stored in the invoice information storage unit 14. A common portion of Email addresses is omitted due to limitations of space in FIG. 7. For example, "2,3,4,5,6rou.sato@jp.xxx.com" in the top record represents "2rou.sato@jp.xxx.com", "3rou.sato@jp.xxx.com", "4rou.sato@jp.xxx.com", "5rou.sato@jp.xxx.com", and "6rou.sato@jp.xxx.com".

FIGS. 8 and 9 illustrate an example of information that is set in a generation information management section.

The generation information management section D3 illustrated in FIGS. 8 and 9 has fields for the following information: Email Domain, User Start Year-Month-Day, User Change Year-Month-Day, User Change Year-Month, User Location Information, User Location (Latitude), User Location (Longitude), Headquarters location Information, Headquarters Location (Latitude), Headquarters Location (Longitude), General-Purpose Company Group Code, and General-Purpose Company Code. Information pieces arranged in a horizontal direction are associated with each other to form a record. The Email Domain field contains the domain of an Email address.

The User Start Year-Month-Day field indicates year, month, and day when a user sent user information. The year, month, and day are registered by the registration unit 12 on the basis of date information on when user information was received.

The User Change Year-Month-Day field indicates year, month, and day when a user changed user information stored in the user information storage unit 11. The year, month, and day are set on the basis of date information on when an Email requesting a change of the user information was received.

The User Change Year-Month field indicates year and month when a user changed user information stored in the user information storage unit 11. The year and month are set on the basis of date information on when an Email requesting a change of the registration information was received.

The User Location Information field indicates the latitude and longitude (World Geodetic System (WGS84)) of a user location. For example, these latitude and longitude are obtained on the basis of the user location by the registration unit 12.

The User Location (Latitude) field indicates the latitude of a user location.

The User Location (Longitude) field indicates the longitude of a user location.

The Headquarters Location Information field indicates the latitude and longitude (headquarters location information) of the headquarters location of the company to which a user belongs.

The Headquarters location (Latitude) field contains a value that is obtained by the registration unit 12 on the basis of headquarters location information. Assume now that, by way of example, the headquarters location has the north latitude of 33 degrees, 52 minutes and 25.349 seconds. At first, the numbers of the integer part of the latitude are enumerated. In this example, "335225" is obtained. Then, "1" is added to the head of the numbers in the case of the north latitude, and "2" is added to the head of the numbers in the case of the south latitude. In the case where the latitude degrees have one digit or two digits, "0" is added to the head of the numbers to make the latitude degrees have three digits. Decimal places are rounded to the nearest whole number. Thereby, in this example, "10335225" is registered in the Headquarters Location (Latitude) field.

The Headquarters location (Longitude) field contains a value that is obtained by the registration unit 12 on the basis of headquarters location information. Assume now that, by way of example, the headquarters location has the east longitude of 130 degrees, 52 minutes and 23.189 seconds. At first, the numbers of the integer part of the longitude are enumerated. In this example, "1305223" is obtained. Then, "1" is added to the head of the numbers in the case of the east longitude, and "2" is added to the head of the numbers in the case of the west longitude. In the case where the longitude degrees have one digit or two digits, "0" is added to the head of the numbers to make the longitude degrees have three digits. Decimal places are rounded to the nearest whole number. Thereby, in this example, "11305223" is registered in the Headquarters Location (Longitude) field.

The General-Purpose Company Group Code field contains information registered in the Country Name field, a value registered in the User Change Year-Month field, a value registered in the Headquarters Location (Latitude) field, a value registered in the Headquarters Location (Longitude) field, and a value registered in the Domain field, which are arranged in this order. Consider the values in the fields for the user management number Ag1 in the generation information management section D3 of FIGS. 8 and 9. The General-Purpose Company Group Code field for the user management number Ag1 contains a code "jp201305103352251130 5223jp.xxx", where information "jp" in the Country Name field, a value "201305" in the User Change Year-Month field, a value "10335225" in the Headquarters Location (Latitude) field, a value "11305223" in the Headquarters Location (Longitude) field, and a value "jp.xxx" in the Domain field are arranged in this order.

The General-Purpose Company Code field contains a value registered in the General-Purpose Company Group Code field and a value registered in the English Company Name field, which are arranged in this order. Note that titles like Co., Ltd., spaces, and commas are not included in the general-purpose company code. For example, the General-Purpose Company Code field for the user management number Ag1 contains a code "jp201305103352251130 5223jp.xxxxx", where a code "jp201305103352251130 5223jp.xxx" in the General-Purpose Company Group Code field and information "xxx" in the English Company Name field are arranged in this order. The following describes invoice information.

Figure 10:
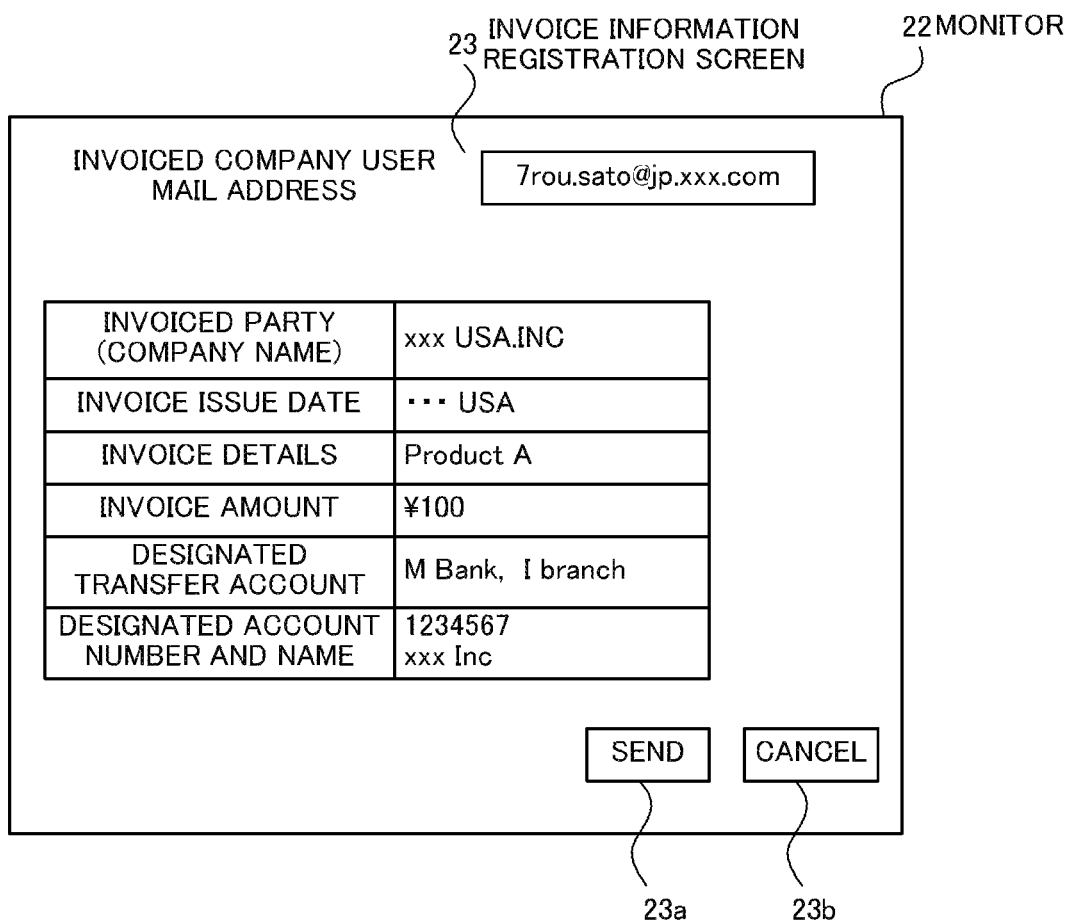
FIG. 10 is a view for explaining an example of an invoice information registration screen.

FIG. 10 is a view for explaining an example of an invoice information registration screen.

An invoice information registration screen 23 illustrated in FIG. 10 is displayed on the monitor 22 connected to the terminal device 20a, for example.

The invoice information registration screen 23 has fields for entering the following information: Invoiced Party (Company Name), Invoice Issue Date, Invoice Details, Invoice Amount, Designated Transfer Account, and Designated Account Number and Name. The invoice information registration screen 23 also has a SEND button 23a and a CANCEL button 23b.

In the Invoiced Party (Company Name) field, the name of an invoiced company is entered.

In the Invoice Issue Date field, an issuance date of an invoice is entered manually or automatically.

In the Invoice Details field, products or services for which an invoice is issued are entered.

In the Invoice Amount field, a charged amount (total amount) is entered.

In the Designated Transfer Account field, the bank name and branch name of an account that is designated for a deposit by a user that enters the invoice information are entered.

In the Designated Account Number and Name field, the account number and name of an account that is designated for a deposit by a user that enters the invoice information are entered.

In this connection, although not illustrated in FIG. 10, additional fields may be provided, such as a field for entering an invoice number uniquely used by a company, a field for entering a trade code, a field for entering the number of a quotation corresponding to an invoice, or a field for entering a unit price.

In response to a user pressing the SEND button 23a, the terminal device 20a sends the invoice information, together with the email address of the user who has generated the invoice information, to the information processing apparatus 10. The invoice processing unit 13 stores the received invoice information in the invoice information storage unit 14.

FIGS. 11 and 12 illustrate an example of information that is stored in an invoice information storage unit.

In this embodiment, invoice information is stored in tabular form. An invoice information management table T2 has fields for the following information: Management Number, Invoice Information Number, Invoice Contact, Invoiced Party, Address, Invoice Details, Invoice Amount, Designated Transfer Account, Designated Account Number and Name, User Location Information, User Location (Latitude), and User Location (Longitude). Information pieces arranged in a horizontal direction are associated with each other to form a record.

The Management Number field contains information identifying a user of an invoicing party and a user of an invoiced party. FIGS. 11 and 12 illustrate invoice information about invoices that a user with user management number A4 creates for users with user management numbers Ag3, B3, Bg4, C3, C5, and C6.

The Invoice Information Number field contains a number identifying invoice information.

The Invoice Contact field contains an Email address entered as an Invoiced Company Contact Person Email Address (Invoiced Company User Mail Address) on the invoice information registration screen 23.

The Invoiced Party, Invoice Details, Invoice Amount, Designated Transfer Account, and Designated Account Number and Name fields contain corresponding information entered on the invoice information registration screen 23.

The Address, User Location Information, User Location (Latitude), and User Location (Longitude) fields contain corresponding information registered in the user information management table T1 of the user who generated the invoice information. In this process, the invoice processing unit 13 detects user information on the basis of an Email address that a user entered to log in to the invoice processing system for generating the invoice information. Then, the detected user information is registered in the appropriate fields of the invoice information management table T2.

When receiving invoice information from a terminal device, the invoice processing unit 13 associates the user information of the invoicing party with the user information of the invoiced party. In this connection, such association is achieved by generating information actually associating these user information, separately from the user information and invoice information, and storing the generated information in the invoice information storage unit 14. Alternatively, the association may be achieved by storing information associating the user management number of the invoicing party and the user management number of the invoiced party with each other in the invoice information storage unit 14.

FIGS. 13 to 20 are views for explaining associations of the user information of an invoicing party and the user information of invoiced parties. FIGS. 13 to 20 illustrate an invoicing-party user information management table T3 and an invoiced-party user information management table T4 where the user information of an invoicing party and the user information of invoiced parties, corresponding to the invoice information illustrated in FIGS. 11 and 12, are associated with each other.

The invoicing-party user information management table T3 illustrated in FIGS. 13, 14, 15, and 16 contains the user information of the user with user management number A4 who is a user of an invoicing party as many as the pieces of invoice information issued. The invoiced-party user information management table T4 illustrated in FIGS. 17, 18, 19, and 20 contains the user information with user management numbers Ag3, B3, Bg4, C3, C5, and C6 of invoiced parties as many as the pieces of invoice information issued.

The following describes a sharer registration process. This sharer registration process enables users having the same general-purpose company group code to share (view or the like) invoice information.

Figure 21:
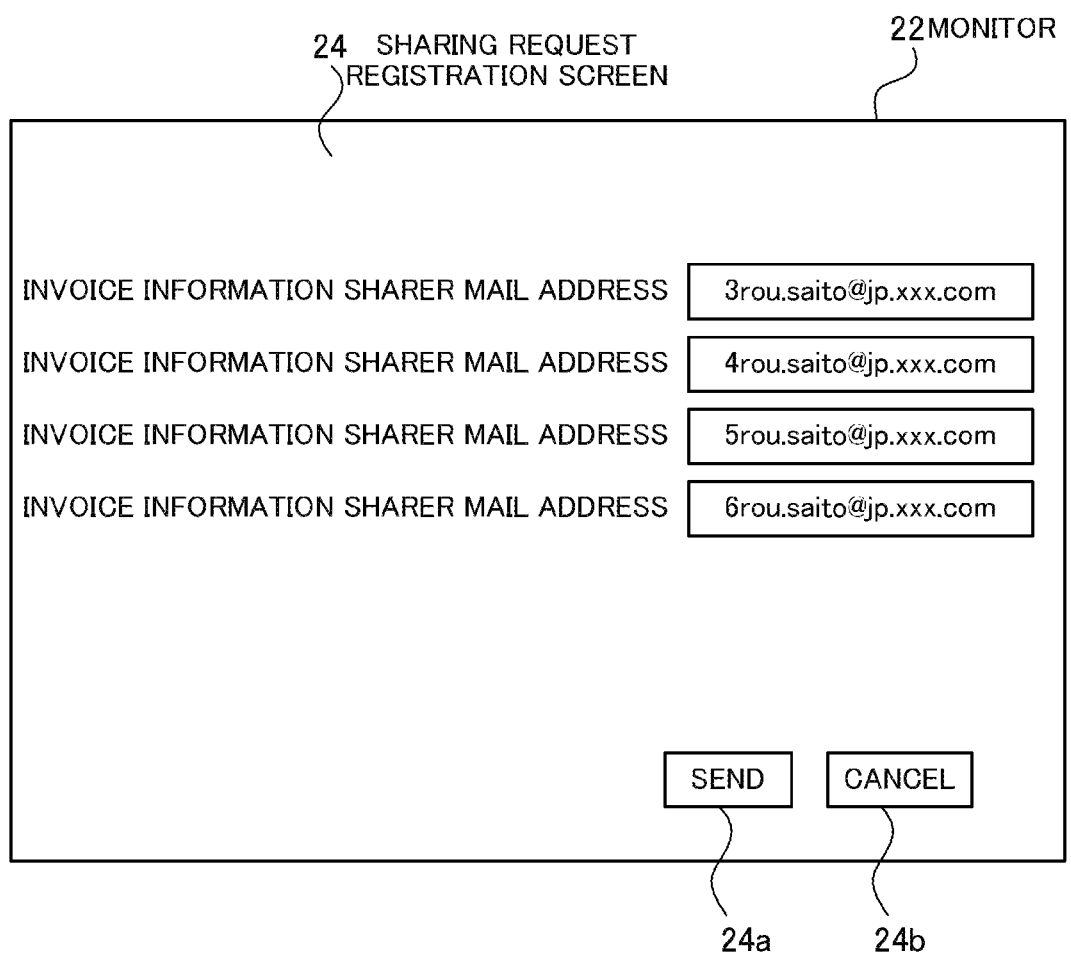
FIG. 21 is a view for explaining an example of a sharing request registration screen.

FIG. 21 is a view for explaining an example of a sharing request registration screen.

A sharing request registration screen 24 illustrated in FIG. 21 is displayed on the monitor 22 connected to the terminal device 20*a*, for example. The sharing request registration screen 24 has fields for entering the mail addresses of invoice information sharers. In each field, the Email address (user identification information) of a user (hereinafter, referred to as a target sharer) who is desired to share invoice information is entered by a user. In this connection, information identifying users is not limited to mail addresses. FIG. 21 illustrates an example where a user with user management number C2 desires to share invoice information with users with user management numbers C3, C4, C5, and C6.

In response to the user pressing a SEND button 24*a*, the terminal device 20*a* sends sharer registration request information to the information processing apparatus 10. This sharer registration request information includes information associating the Email addresses entered in the individual invoice information sharer mail address fields with the Email address of the user with user management number C2. When receiving the Email addresses entered in the invoice information sharer mail address fields from the terminal device 20*a*, the registration unit 12 sends an Email (approval request mail) to these Email addresses to make an inquiry as to whether to treat the user with user management number C2 as a sharer.

By the way, in the case where a target sharer that received an approval request mail approves the sharing of invoice information with the user with user management number C2, the target sharer puts a check in a check box (not illustrated) to indicate that the registration of a sharer indicated in the approval request mail is approved. Then, the target sharer returns the approval request mail. When receiving the returned approval request mail, the registration unit 12 registers the Email address of the target sharer in the In-House Sharer field in the user information management section D2.

FIG. 22 is a view for explaining how to register a sharer.

As indicated in a user information management section D2 illustrated in FIG. 22, registration of a user permitted to share data allows the user to access data of a person who permits the sharing. For example, the user information of FIG. 22 indicates that invoice information generated by 2ro Saito is accessible to 3ro Saito, Oro Saito, 5ro Saito, and 6ro Saito who are permitted to share the invoice information (data is viewable as a copy of invoice information).

The following describes processes that are performed by the registration unit 12, with reference to flowcharts.

Figure 23:
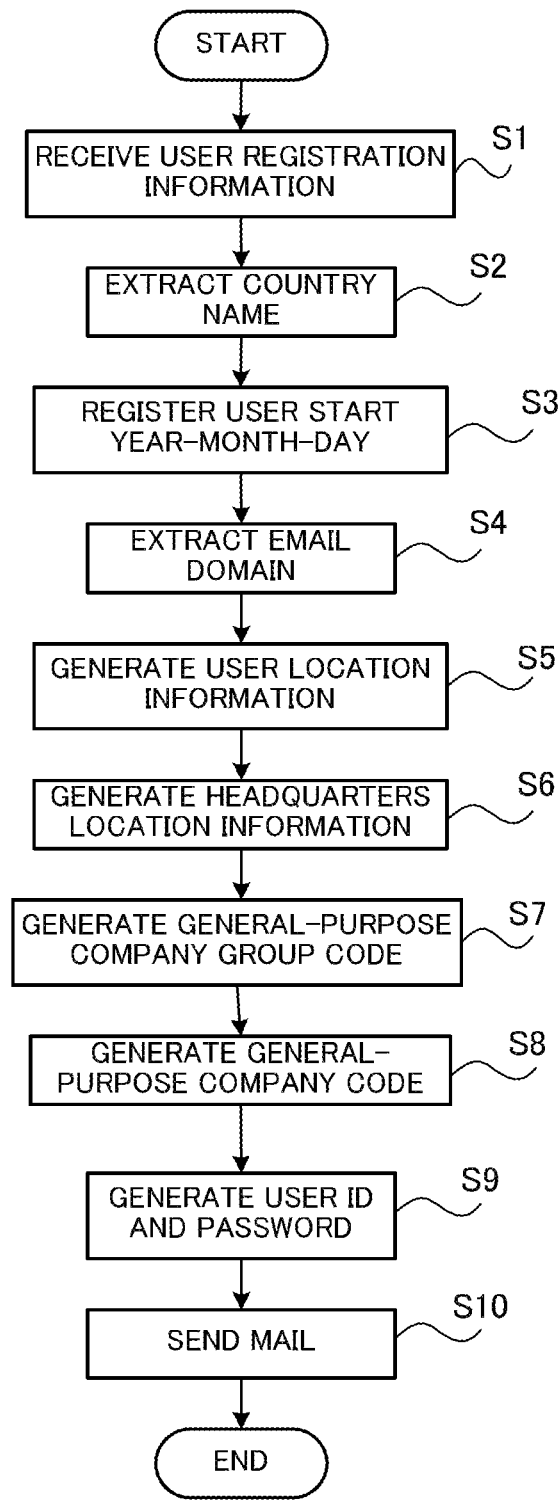
FIG. 23 is a flowchart illustrating a process that is performed by a registration unit.

FIG. 23 is a flowchart illustrating a process that is performed by a registration unit.

Step S1: The registration unit 12 receives user information from each terminal device. Then, the process proceeds to step S2.

Step S2: The registration unit 12 extracts a country name from the user information received at step S1, and registers the country name in the user information management table T1. Then, the process proceeds to step S3.

Step S3: The registration unit 12 registers a date when the user information was received, in the User Start Year-Month-Day field in the user information management table T1. Then, the process proceeds to step S4.

Step S4: The registration unit 12 extracts an Email domain from the Email address included in the user information, and registers the Email domain in the user information management table T1. Then, the process proceeds to step S5.

Step S5: The registration unit 12 generates user location information on the basis of a user location included in the user information, and registers the user location information in the user information management table T1. Then, the process proceeds to step S6.

Step S6: The registration unit 12 generates headquarters location information on the basis of a headquarters location included in the user information, and then registers the headquarters location information in the user information management table T1. Then, the process proceeds to step S7.

Step S7: The registration unit 12 generates a general-purpose company group code with the above-described method, and registers the general-purpose company group code in the user information management table T1. Then, the process proceeds to step S8.

Step S8: The registration unit 12 generates a general-purpose company code with the above-described method, and registers the general-purpose company code in the user information management table T1. Then, the process proceeds to step S9.

Step S9: The registration unit 12 generates a user ID and password. Then, the process proceeds to step S10.

Step S10: The registration unit 12 sends the user ID and password generated at step S9, to the Email address included in the user information. Then, the process of FIG. 23 is completed.

The following describes a sharer registration process. In the following, assume that a user A1 generates sharer registration request information using the terminal device 20*a*, and sends the sharer registration request information to the information processing apparatus 10.

Figure 24:
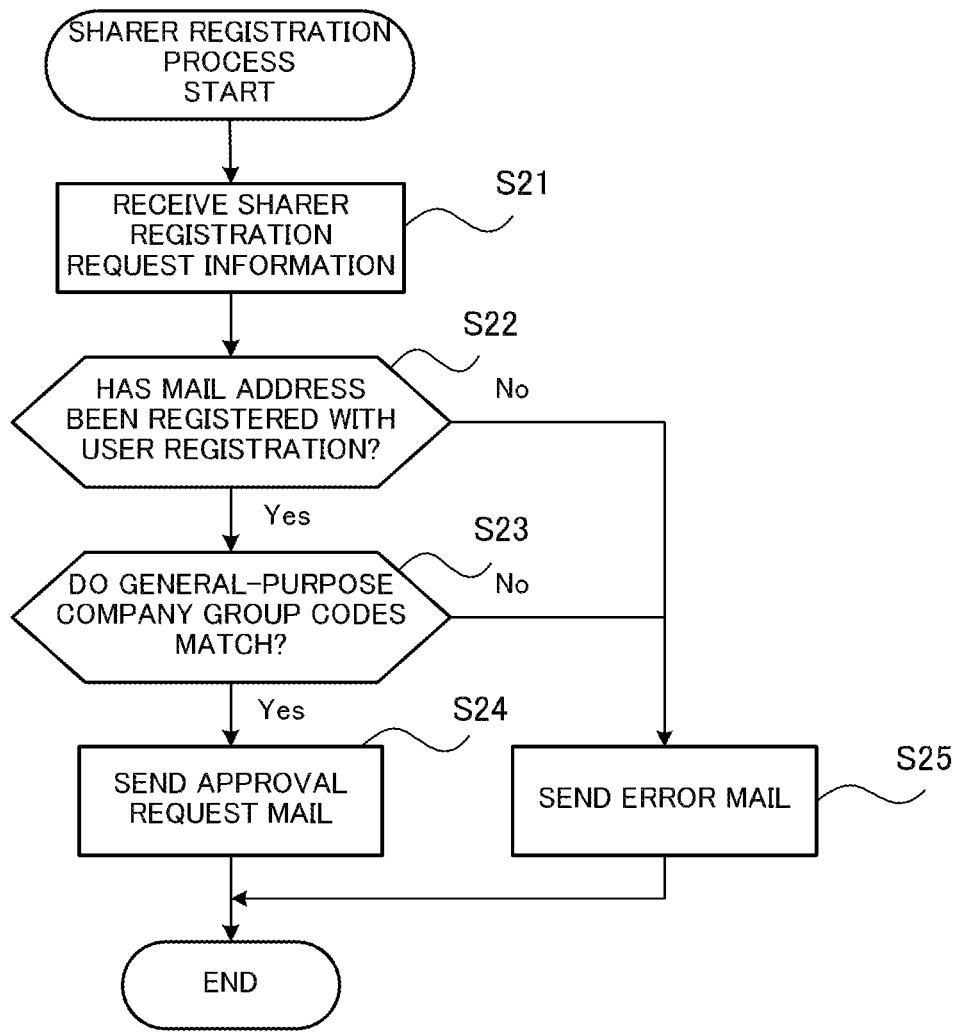
FIG. 24 is a flowchart illustrating a sharer registration process.

FIG. 24 is a flowchart illustrating a sharer registration process.

Step S21: The registration unit 12 receives sharer registration request information from the user A1. Then, the process proceeds to step S22.

Step S22: The registration unit 12 refers to the Email field of the user information management table T1. Then, the registration unit 12 determines whether the Email field contains the same Email address as included in the sharer registration request information received at step S21. If the same Email address as included in the sharer registration request information is found in the Email field (Yes in step S22), the process proceeds to step S23. If the same Email address as included in the sharer registration request information is not found in the Email field (No in step S22), the process proceeds to step S25.

Step S23: The registration unit 12 refers to the general-purpose company group code in the user information management table T1. Then, the registration unit 12 determines whether the general-purpose company group code associated with the Email address included in the sharer registration request information matches the general-purpose company group code of the user A1. If the general-purpose company group code associated with the Email address included in the sharer registration request information matches the general-purpose company group code of the user A1 (Yes at step S23), the process proceeds to step S24. If the general-purpose company group code associated with the Email address included in the sharer registration request information does not match the general-purpose company group code of the user A1 (No at step S23), the process proceeds to step S25.

Step S24: The registration unit 12 sends an approval request mail destined for the Email address included in the sharer registration request information. This approval request mail includes a check box indicating whether registration as a sharer is approved, for example. Then, the process of FIG. 24 is completed.

Step S25: The registration unit 12 sends an error mail destined for the Email address of the user A1. The error mail includes information indicating that the registration as a sharer has failed and information indicating countermeasures. For example, if the same Email address as included in the sharer registration request information is not found in the Email field of the user information management table T1 at step S22, the registration unit 12 sends a mail indicating this error and also indicating that user registration of the sharer solves the error.

By the way, as described earlier, in the case where a target sharer who received an approval request mail approves the sharing of invoice information with the user A1, the target sharer puts a check in a check box included in the approval request mail, to indicate the approval of the registration as a sharer. Then, the target sharer returns the approval request mail. When receiving the returned approval request mail, the registration unit 12 registers the Email address of the target sharer in the In-House Sharer field for the user A1 in the user information management section D2. The registration unit 12 also registers the Email address of the user A1 in the In-House Sharer field for the target sharer in the user information management section D2.

In this embodiment, the case of mutual approval has been described. Alternatively, the registration unit 12 may perform a process of, for example, registering the Email address of the user A1 in the In-House Sharer field with respect to a target sharer in the user information management section D2, without registering the Email address of the target sharer in the In-House Sharer field with respect to the user A1 in the user information management section D2. This enables the user A1 to view invoice information generated by the sharer but does not allow the sharer to view invoice information generated by the user A1, for example.

The following describes how to register invoice information in the information processing apparatus 10.

In the following, a user that sends invoice information is called "an invoicing user" and a user that receives invoice information is called "an invoiced user".

In order to register invoice information in the information processing apparatus 10, there are two kinds of processes: a process of registering invoice information one by one (an individual registration process), and a process of collectively registering a plurality of invoice information (a unified registration process). These processes will be described in order.

Figure 25:
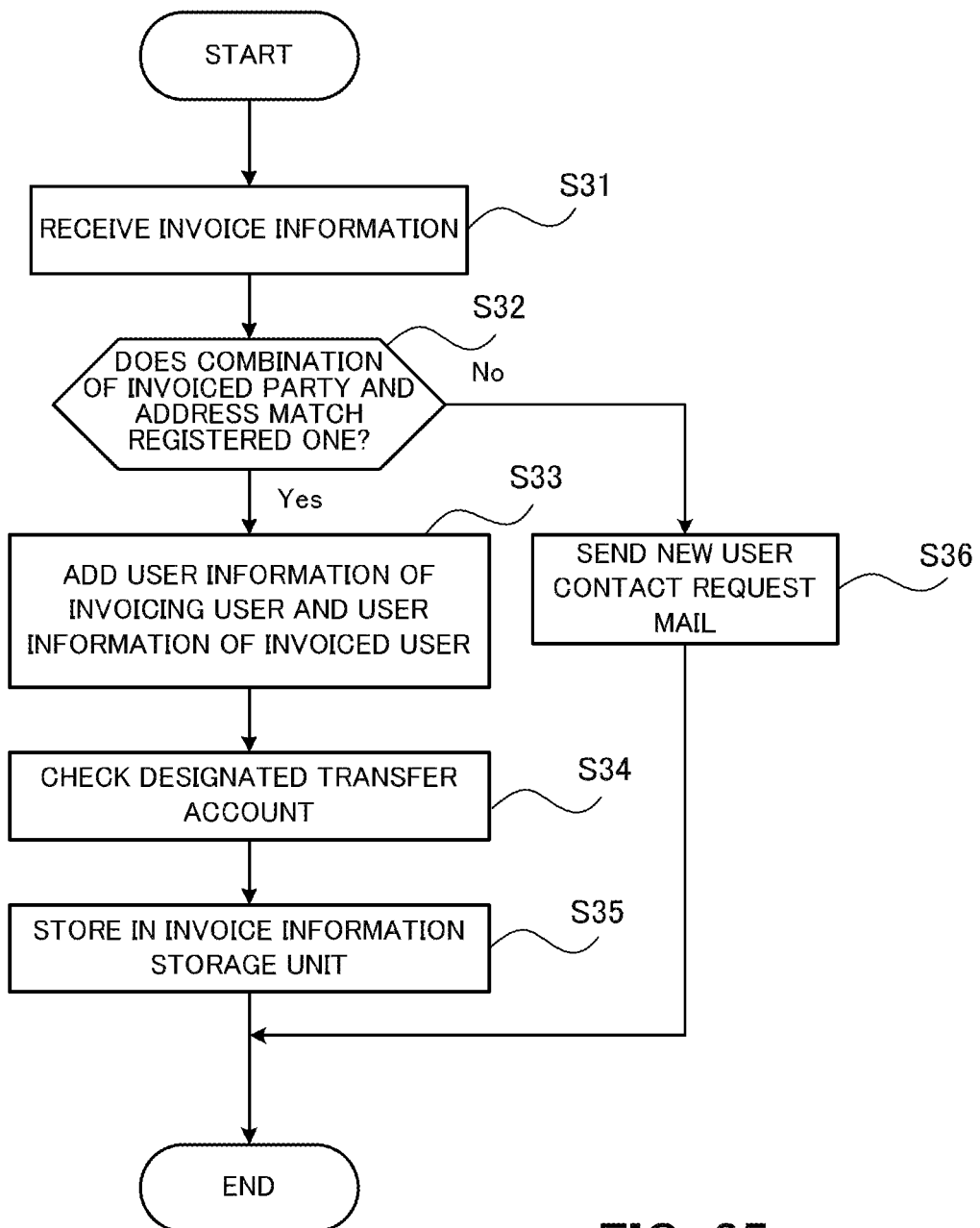
FIG. 25 is a flowchart for explaining an individual registration process for registering invoice information.

FIG. 25 is a flowchart for explaining an individual registration process for registering invoice information.

Step S31: The invoice processing unit 13 receives invoice information from a terminal device. Then, the process proceeds to step S32.

Step S32: The invoice processing unit 13 determines whether a combination of the invoiced party and address associated with the Email address of the invoiced user in the invoice information received at step S31 matches a combination of the invoiced party and address included in the registration information specified by the Email address of the invoiced user included in the invoice information. If a match is found (Yes at step S32), the process proceeds to step S33. If a match is not found (No at step S32), the process proceeds to step S36.

Step S33: The invoice processing unit 13 associates the user information of the invoicing user, the user information of the invoiced user, and the generation information, stored in the user information management table T1, with the invoice information received at step S31. Then, the process proceeds to step S34.

Step S34: The invoice processing unit 13 connects to the system of the bank with bank name included in the invoice information to determine whether the designated transfer account included in the invoice information received at step S31 exists with the same account name. Then, the process proceeds to step S35.

Step S35: The invoice processing unit 13 stores the invoice information having added thereto the user information of the invoicing user and the user information of the invoiced user at step S33, in the invoice information storage unit 14. Then, the process of FIG. 25 is completed.

Step S36: The invoice processing unit 13 sends an Email destined for the Email address of the invoiced user included in the invoice information received at step S31. In the body of the Email, a request requesting the new user for contact is described. Then, the process of FIG. 25 is completed.

After the information processing apparatus 10 performs the process of FIG. 25, the invoicing user and the invoiced user are able to log in to the invoice processing system and access invoice information.

The following describes how to collectively register invoice information.

Figure 26:
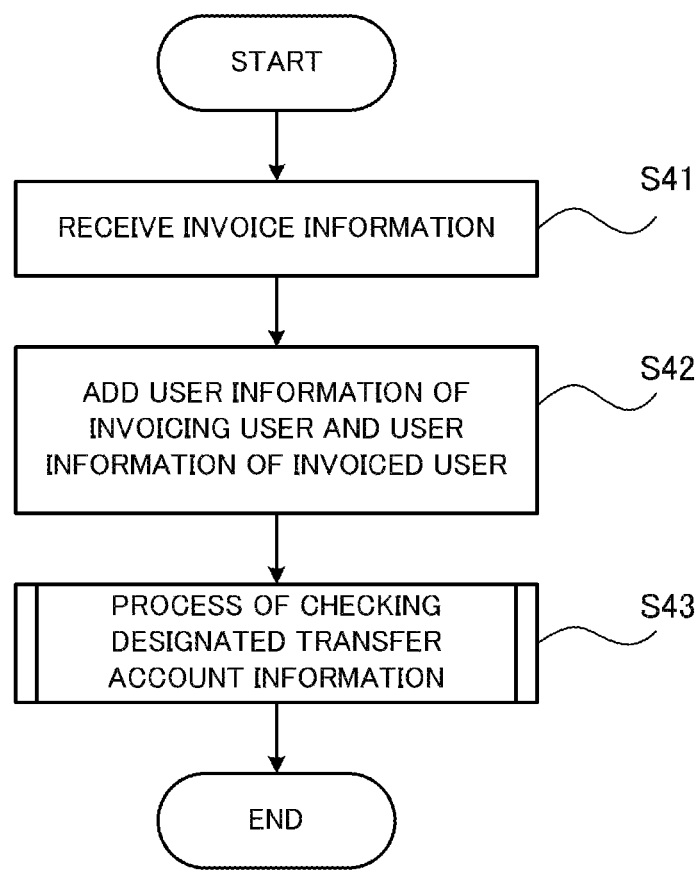
FIG. 26 is a flowchart for explaining a unified registration process for registering invoice information.

FIG. 26 is a flowchart for explaining a unified registration process for registering invoice information.

Step S41: The invoice processing unit 13 collectively receives invoice information. Then, the process proceeds to step S42.

Step S42: The invoice processing unit 13 adds the user information of the invoicing user and the user information of the invoiced user to the individual invoice information received at step S41. Then, the process proceeds to step S43.

Step S43: The invoice processing unit 13 connects to the system of the bank with bank name included in the invoice information to check if the designated transfer account included in the individual invoice information exists with the same account name. After the check is complete, the process of FIG. 26 is completed.

The following describes step S43 (check process) in detail.

Figure 27:
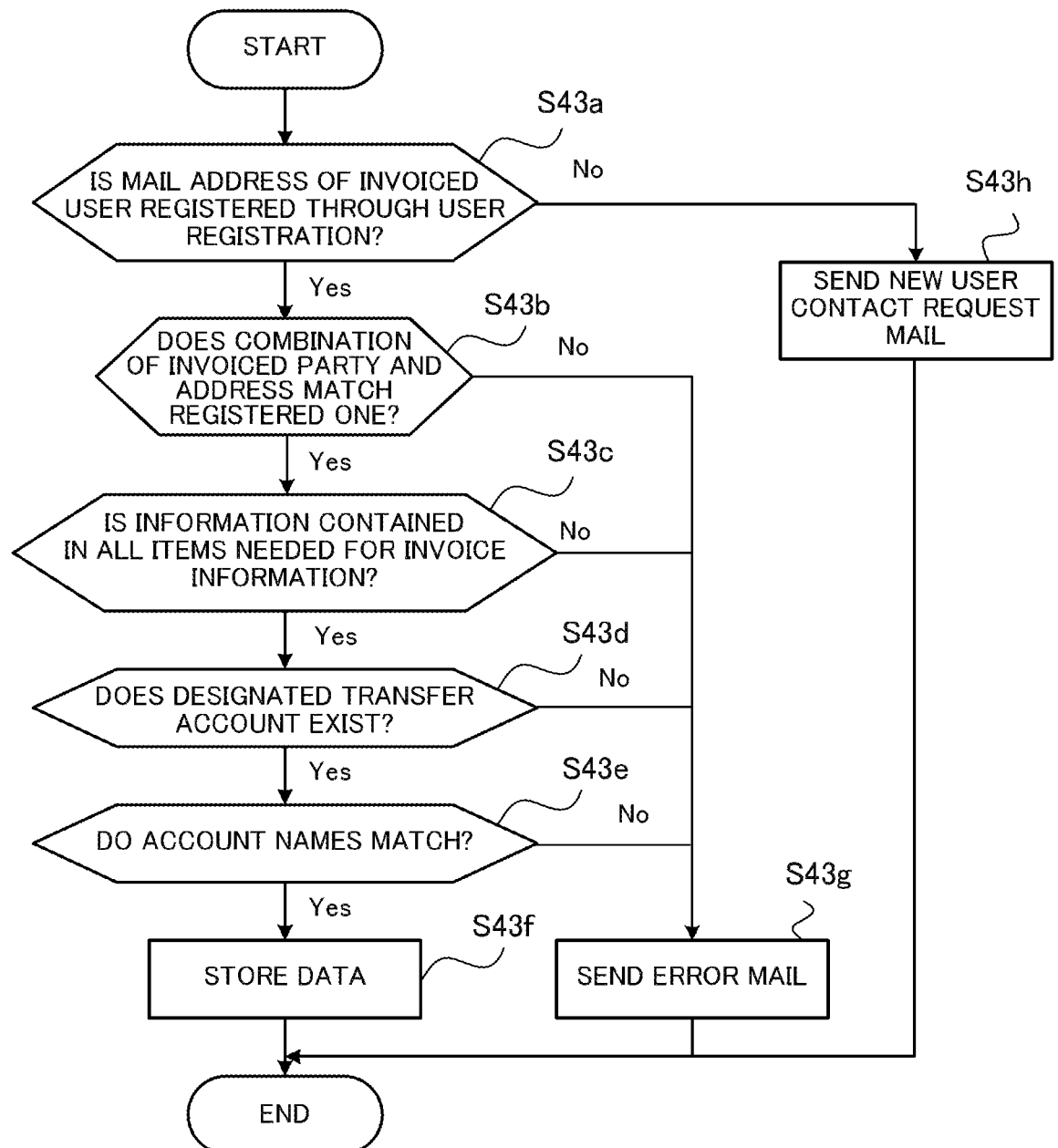
FIG. 27 is a flowchart for explaining a check process.

FIG. 27 is a flowchart for explaining a check process.

Step S43a: The invoice processing unit 13 determines whether the Email address of an invoiced user included in invoice information exists as registration information in the user information management table T1. If the Email address of the invoiced user included in the invoice information is found as the registration information in the user information management table T1 (Yes at step S43a), the process proceeds to step S43b. If the Email address of the invoiced user included in the invoice information is not found as the registration information in the user information management table T1 (No at step s43a), the process proceeds to step S43h.

Step S43b: The invoice processing unit 13 determines whether a combination of the invoiced party and address associated with the Email address of the invoiced user in the invoice information received at step S41 matches a combination of the invoiced party and address of the registration information specified by the Email address of the invoiced user included in the invoice information. If a match is found (Yes at step S43b), the process proceeds to step S43c. If a match is not found (No at step S43b), the process proceeds to step S43g.

Step S43c: The invoice processing unit 13 determines whether information is contained in all items needed for the invoice information. If information is contained in all items needed for the invoice information (Yes at step S43c), the process proceeds to step S43d. If information is not registered in any of the items needed for the invoice information, that is, if any of the items needed for the invoice information is blank (No at step S43c), the process proceeds to step S43g.

Step S43d: The invoice processing unit 13 connects to the system of the bank with bank name included in the invoice information to determine whether the designated transfer account included in the invoice information received at step S41 exists. If the designated transfer account included in the invoice information is found (Yes at step S43d), the process proceeds to step S43e. If the designated transfer account included in the invoice information is not found (No at step S43d), the process proceeds to step S43g.

Step S43e: The invoice processing unit 13 determines whether the account names match. If the account names match (Yes at step S43e), the process proceeds to step S43f. If the account names do not match (No at step S43e), the process proceeds to step S43g.

Step S43f: The invoice processing unit 13 stores the invoice information having added thereto the user information of the invoicing user and the user information of the invoiced user at step S41, in the invoice information storage unit 14. Then, the process of FIG. 27 is completed.

Step S43g: The invoice processing unit 13 sends an error mail destined for the Email address of the user A1. The error mail includes information indicating that the registration as a sharer has failed and information indicating countermeasures, similarly to the error mail described at step S25.

Step S43h: The invoice processing unit 13 sends an Email destined for the Email address of the invoiced user included in the invoice information received at step S41. In the body of the Email, for example, a request requesting user registration in the invoice processing system is described. Then, the process of FIG. 27 is completed.

By the way, the invoiced user is able to operate the terminal device to receive invoice information stored through the invoice information registration process in the invoice information storage unit 14, and inspect the invoice information.

After confirming that there is no error in each item of the invoice information, the invoiced user conducts the inspection on the Web. If any error is found in any of the items of the invoice information, the invoiced user sends an email requesting a correction of the erroneous items (item correction request mail) to the invoicing user. For example, there is a check box for pointing an erroneous item on a Web screen, and when the invoiced user puts a check in the check box for an erroneous item and presses a button for correction request, the terminal device creates and sends an item correction request mail destined for the Email address of the invoicing user.

To correct items, the invoicing user that received the item correct request mail logs in to the invoice processing system. Then, the invoicing user corrects the pointed erroneous item on a correction screen displayed on the monitor. Then, in response to the invoicing user pressing a button for correction completion, the terminal device creates and sends an item correction completion mail destined for the Email address of the invoiced user.

The following describes an invoice information sharing process, with reference to a flowchart.

Figure 28:
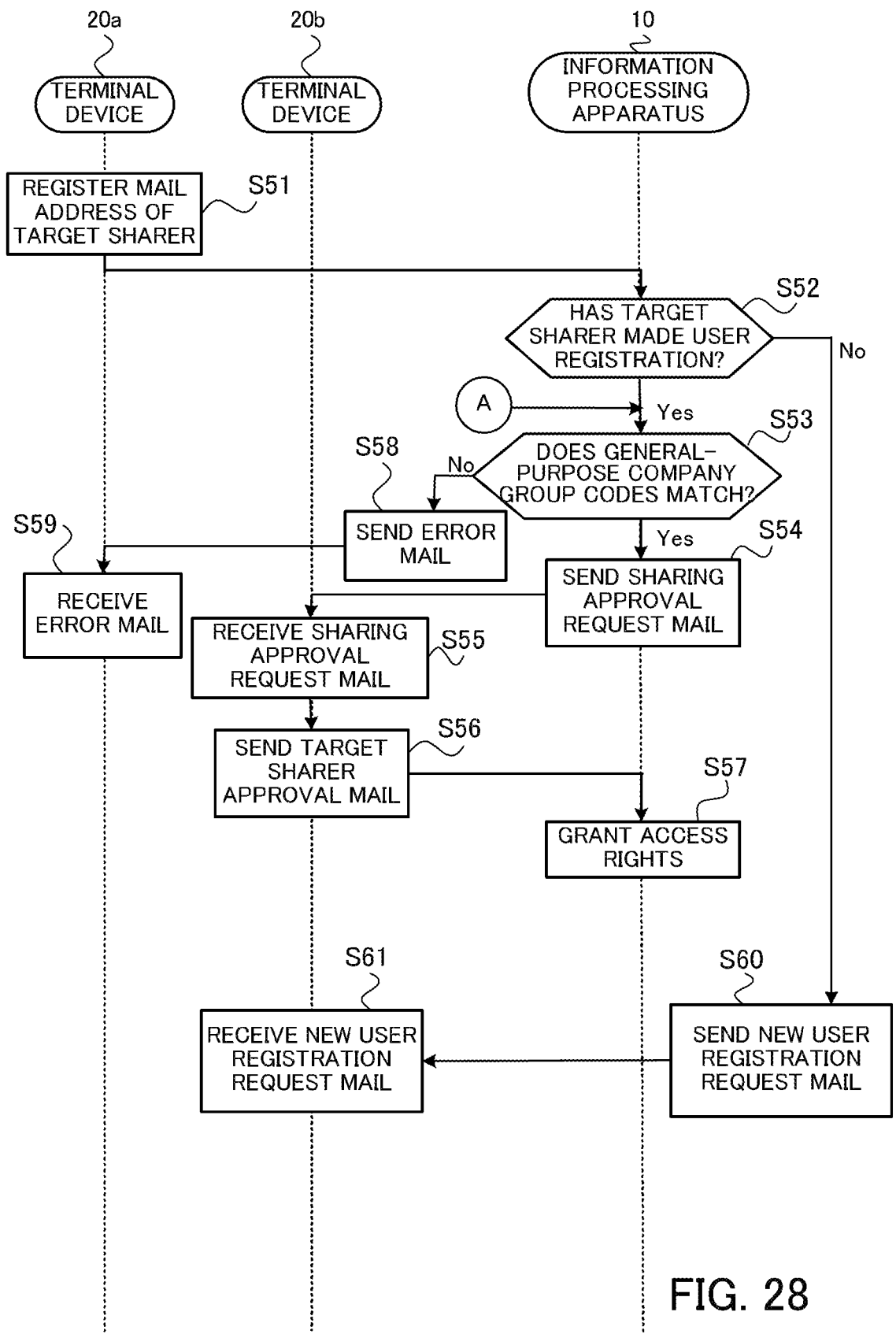
FIG. 28 is a view for explaining an invoice information sharing process.

FIG. 28 is a view for explaining an invoice information sharing process. The order of steps of FIG. 28 does not represent the time series.

Step S51: After the user A1 enters the Email address of a target sharer that the user A1 desires to share invoice information on the sharing request registration screen 24 and presses the SEND button 24a, the terminal device 20a sends sharer registration request information including the Email address of the target sharer.

Step S52: When receiving the sharer registration request information, the registration unit 12 determines with reference to the Email field of the user information management table T1 whether the target sharer has already made user registration. More specifically, the registration unit 12 determines whether the Email address of the target sharer is registered in the Email field. If the Email address of the target sharer is registered in the Email field, that is, if the target sharer has already made the user registration (Yes at step S52), the process proceeds to step S53. If the Email address of the target sharer is not registered in the Email field, that is, if the target sharer has not made the user registration (No at step S52), the process proceeds to step S60.

Step S53: The registration unit 12 determines with reference to the General-Purpose Company Group Code field of the user information management table T1 whether the general-purpose company group code of the target sharer matches the general-purpose company group code of the user A1. If the general-purpose company group code of the target sharer matches the general-purpose company group code of the user A1 (Yes at step S53), the process proceeds to step S54. If the general-purpose company group code of the target sharer does not match the general-purpose company group code of the user A1 (No at step S53), the process proceeds to step S58.

Step S54: The registration unit 12 sends an Email (sharing approval request mail) destined for the Email address of the target sharer to request the target sharer for approval.

Step S55: The terminal device 20b receives the sharing approval request mail.

Step S56: When the target sharer logs in to the invoice processing system, the terminal device 20b displays a sharer approval screen (not illustrated) on the Web browser. This sharer approval screen includes, for example, a check box for indicating whether approval as a sharer is accepted. If the target sharer puts a check in the checkbox and presses a SEND button, the terminal device 20b returns the sharer approval information including the Email address of the target sharer to the information processing apparatus 10. Then, the process proceeds to step S57.

Step S57: The registration unit 12 registers the Email address of the target sharer included in the sharer approval information received at step S57, in the In-House Sharer field of the user information management table T1. This enables target sharer to access invoice information generated by the user A1.

Step S58: The registration unit 12 sends an error mail destined for the Email address of the user A1. The error mail includes information indicating that the registration as a sharer has failed and information indicating the reason of the failure. For example, in the case where it is determined at step S52 that the general-purpose company code of the sharer does not match the general-purpose company code of the user A, the error mail indicates this unmatching.

Step S59: The terminal device 20a receives the error mail.

Step S60: The registration unit 12 sends a user registration request mail destined for the Email address of the target sharer. The user registration request mail includes information indicating that the user A1 asks the target sharer to perform the registration, and the URL of the registration screen.

Step S61: The terminal device 20b receives the user registration request mail. When the target sharer performs user registration and then logs in to the invoice processing system, the registration unit 12 executes step S53 and subsequent steps. The explanation of FIG. 28 ends.

The following describes a deposit process.

Figure 29:
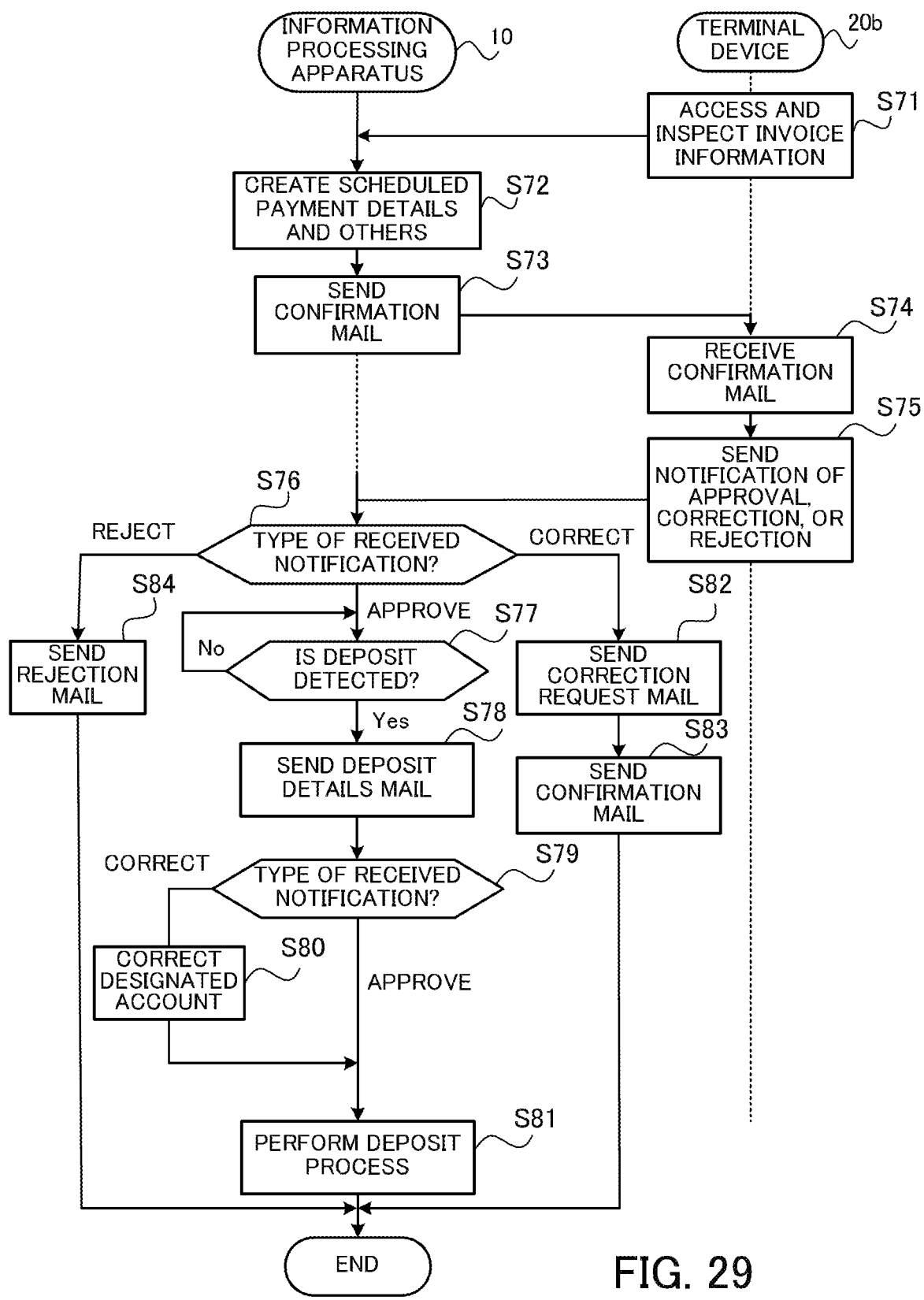
FIG. 29 is a view for explaining a deposit process.

FIG. 29 is a view for explaining a deposit process.

Step S71: The terminal device 20b notifies the information processing apparatus 10 that an invoiced user B1 accessed and inspected invoice information issued for the company B.

Step S72: The deposit processing unit 13b obtains a payment due date, scheduled payment amount, commission fee, and scheduled payment details on the basis of the invoice information inspected at step S71. With regard to each of the scheduled payment amount and commission fee, a total amount is calculated for each transfer account number. Which invoice information to compile are (1) invoice information whose payment due dates are within a prescribed period (for example, invoices whose due dates are within a period from July 24 to July 31), (2) invoice information with the same payment due date, or others. Then, the process proceeds to step S73.

Step S73: The deposit processing unit 13b creates a payment details confirmation mail destined for the Email address of the user B1. This payment details confirmation mail includes a URL allowing access to a payment details confirmation screen, which will be described later.

Step S74: The terminal device 20b receives the payment details confirmation mail. When the user clicks the URL link included in the payment details confirmation mail, the terminal device 20b displays the payment details confirmation screen on the Web browser.

Figure 30:
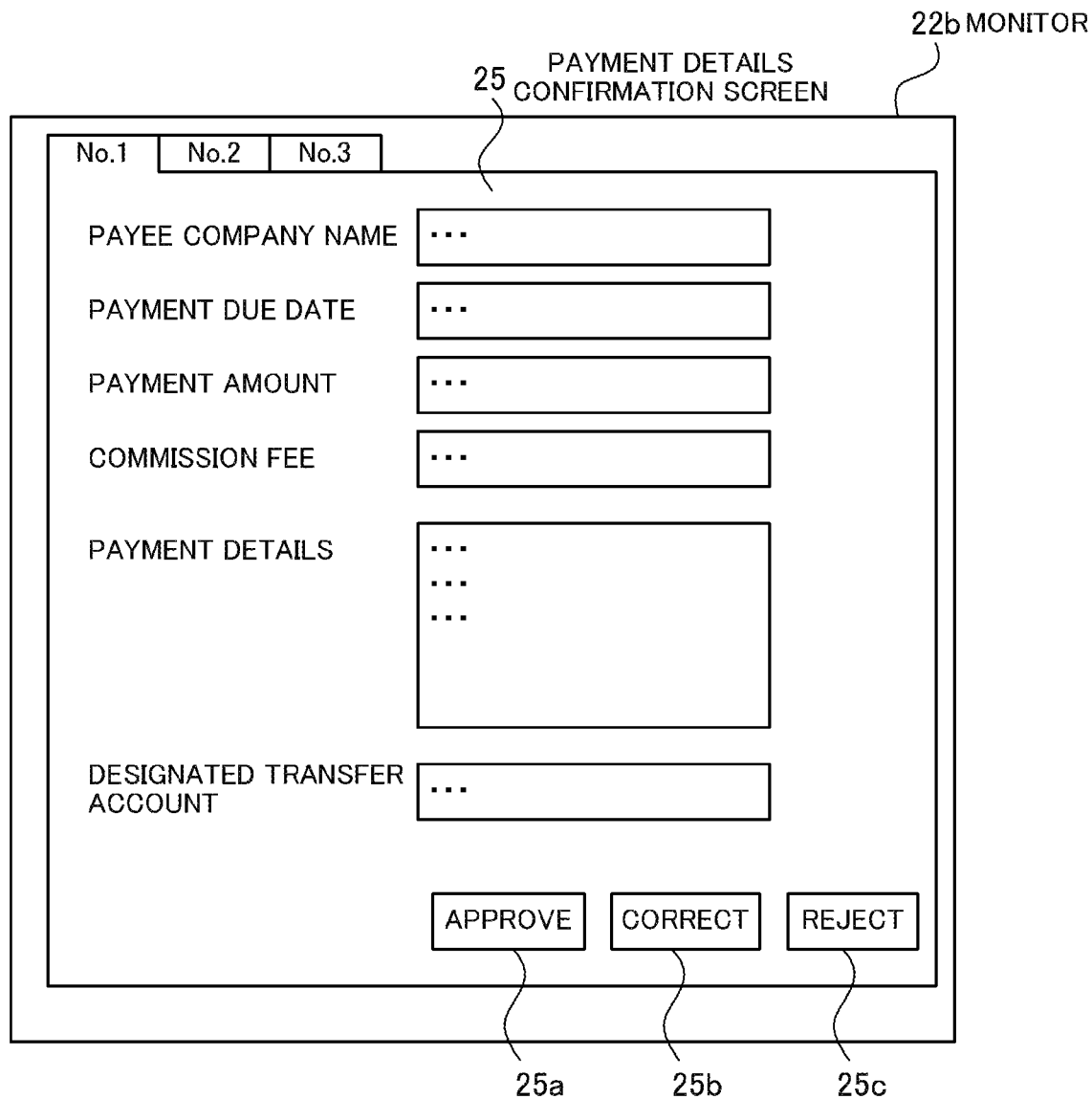
FIG. 30 illustrates an example of a payment details confirmation screen.

FIG. 30 illustrates an example of a payment details confirmation screen.

For example, a payment details confirmation screen 25 displays a payee company name, a payment due date, a payment amount, a commission fee, payment details, a designated transfer account, and others. With regard to each of the payment amount and commission fee, a total amount is displayed for each payee account number. As the payment details, the breakdown of individual invoices is displayed. As the designated transfer account, an account number previously stored in the information processing apparatus 10 by an administrator of the information processing apparatus 10 is displayed, instead of the account numbers of designated transfer accounts that are designated by individual users and included in invoice information.

The payment details confirmation screen 25 includes an APPROVE button 25a, a CORRECT button 25b, and a REJECT button 25c.

In addition, on the upper left part of the payment details confirmation screen 25, a number is assigned to a tab for each payee company.

Step S75: When the user B1 presses any of the APPROVE button 25a, CORRECT button 25b, and REJECT button 25c, the terminal device 20b notifies the information processing apparatus 10 of this action.

Step S76: The deposit processing unit 13b determines whether the received notification indicates approval, correction, or rejection. If the notification indicates approval (Approve at step S76), the process proceeds to step S77. If the notification indicates correction (Correct at step S76), the process proceeds to step S82. If the notification indicates Rejection (Reject at step S76), the process proceeds to step S84.

Step S77: The deposit processing unit 13b periodically accesses the account to check a deposit to the account. When there is a deposit (Yes at step S77), the process proceeds to step S78.

Step S78: The deposit processing unit 13b creates a mail (deposit details mail) for deposit details, which is destined for the Email address of the invoicing user. The deposit details mail includes a URL linking to a deposit details screen. Then, the process proceeds to step S79.

The terminal device 20a receives the deposit details mail. When the invoicing user clicks the URL link included in the deposit details mail, the terminal device 20a displays the deposit details screen on the Web browser. For example, the deposit details screen displays a scheduled deposit amount, account number to be used for the deposit, and others. The displayed information is generated by the deposit processing unit 13b on the basis of the invoice information generated by the invoicing user.

In addition, the deposit details screen displays an APPROVE button and a CORRECT button. The invoicing user presses the APPROVE button when the displayed details are appropriate. If the invoicing user corrects the details, the invoicing user corrects the designated transfer account number, and then presses the CORRECT button. When the invoicing user presses either of the APPROVE and CORRECT buttons, the terminal device 20a notifies the information processing apparatus 10 of this action.

Step S79: The deposit processing unit 13b determines whether the received notification indicates approval or correction. If the received notification indicates approval (Approve at step S79), the process proceeds to step S81. If the received notification indicates correction (Correct at step S79), the process proceeds to step S80.

Step S80: The deposit processing unit 13b corrects the designated transfer account included in the invoice information. Then, the process proceeds to step S81.

Step S81: The deposit processing unit 13b executes a deposit process of making a deposit to the designated transfer account included in the invoice information.

Step S82: The deposit processing unit 13b creates and sends a correction request mail destined for the Email address of the invoicing user.

Step S83: When receiving a reply to the correction request mail, the deposit processing unit 13b corrects the invoice information, and creates and sends a payment details confirmation mail destined for the Email address of the user B1 again. Then, when receiving a reply from the terminal device 20b, the process proceeds to step S76 to execute step S76 and subsequent steps.

Step S84: The deposit processing unit 13b creates and sends a rejection mail destined for the Email address of the invoicing user.

As described above, with the information processing apparatus 10, the sharer registration process enables viewing of all invoices of companies owned by the same parent company. Thereby, it becomes possible to provide a service to integrate invoices communicated between a plurality of companies into invoice information for a single interface. More specifically, it is easy for an invoiced user to request invoices in form of data via Web. It is also easy for the asked invoicing user to process the request.

Users are able to use the invoice processing system immediately after performing user registration.

Further, companies, regardless of how big or small the companies may be, solo proprietors, or anyone is able to communicate invoices via a common interface.

Still further, if more communication is performed between users and this ends up, for example, involving several tens of users in one company in performing the communication, this means that the several tens of users receive invoice data from a variety of companies. By configuring a system in which users performing the communication in the company are searched for and information can be made sharable among the users, it makes it possible to perform the unified management (integration) of received data.

This system is that a user first tries to use the system, like performing mail communication, and then shares invoicing parties, and then integrate invoice information. Therefore, it is possible to operate the system without a specific administrator.

In this connection, although not illustrated, the information processing apparatus 10 may be designed to send a mail to each user whose Email address is registered, so as to encourage the user to update his/her user information.

In addition, in the case where the administrator of the information processing apparatus 10 finds an error in an English company name during the maintenance of user information, he/she may send an Email indicating the error to the Email address of the corresponding user in order to ask the user to correct the registration information.

In addition, the recipients of simultaneous transmission may be determined on the basis of user location information and sharer information, among users whose Email addresses have the same domain or users who have the same general-purpose company group code. By periodically sending mails simultaneously, a user may find another user who have an "English company name", which is manually entered, different from others and communicate him/her in order to ask him/her to correct the error.

Second Embodiment

The following describes a system according to a second embodiment. In the following, only differential features of the system of the second embodiment from the first embodiment will be described, and the same features will not be described.

FIG. 31 illustrates an example of information that is set in a user information management section according to the second embodiment.

The first embodiment uses an English company name for generating a general-purpose company code. However, instead of the English company name, a company number (so-called legal entity social security number) that is assigned under the Law 58 regarding the use of numbers identifying individuals in administrative procedures may be used.

In this case, a user is caused to enter a company number, and as illustrated in FIG. 31, the company number is stored in a user information management section D2. Then, a general-purpose company code is generated with the same method as in the first embodiment. That is, in a General-Purpose Company Code field of the second embodiment, a value registered in a General-Purpose Company Group Code field and a value registered in a Company Number field are arranged in this order.

Further, in the second embodiment, company numbers may be used also as general-purpose company codes.

Still further, in the second embodiment, social security numbers for individuals and solo proprietors may be used also as general-purpose company codes.

The system of the second embodiment produces the same effects as that of the first embodiment.

In this connection, the processes performed by the information processing apparatus 10 may be performed by a plurality of devices in a distributed manner. For example, a device may perform processes up to registration of registration information and another device may perform a deposit process using the registration information. In addition, any currencies including currencies that actually exist and virtual currencies, which include, for example, Bitcoins and Ripple, may be used in the processing method of the embodiments.

Heretofore, information processing apparatuses and methods for granting access rights have been described in the illustrated embodiments. Other embodiments may not be limited thereto and described components may be replaced with other components having equivalent functions. In addition, other components or processing operations may be added to example embodiments.

Still further, desired two or more configurations (features) in the above-described embodiments may be combined.

In this connection, the above-described processing functions may be implemented by using a computer. In this case, a program describing the processing content of the functions of the information processing apparatus 10 is provided. The processing functions are implemented on the computer by the computer running the program. The program describing the processing content is recorded on a computer-readable recording medium. Computer-readable recording media include magnetic storage devices, optical discs, magneto-optical recording media, semiconductor memories, and others. Magnetic storage devices include hard disk drives, Flexible Disks (FD), magnetic tapes, and others. Optical discs include DVD, DVD-RAM, CD-ROM, CD-RW, and others. Magneto-optical recording media include MO (Magneto-Optical disk) and others.

To distribute the program, for example, portable recording media, such as DVD or CD-ROM, on which the program is recorded may be put on sale. Alternatively, the program may be stored in the storage device of a server computer and may be transferred from the server computer to another computer through a network.

A computer that executes the program may store, for example, the program recorded on a portable recording medium or the program received from the server computer to its local storage device, read the program from the local storage device, and then run the program. In this connection, the computer may run the program while reading the program directly from the portable recording medium. In addition, the computer may run the program while receiving the program from the server computer connected over a network.

Further, at least part of the above processing functions may be implemented by using DSP (Digital Signal Processor), ASIC (Application Specific Integrated Circuit), PLD (Programmable Logic Device), or other electronic circuits.

In addition, a receipt issuance function may be added to an invoice issuance system. More specifically, such a system may be designed so that a receipt is immediately sent by simply touching a tablet at the time of checkout (payment) (as one example, in response to only pressing an OK button on a tablet, a process of sending a receipt is performed and completed within two seconds). To this end, users are requested to register their fingerprints, pictures of their faces using an application in advance. In the case where fingerprints are registered, a user touches a tablet owned by a store to display the email address of the recipient of a receipt. When the user presses the OK button, the receipt is sent. In the case where a face picture is registered, a user performs facial authentication to display the email address of the recipient of a receipt. It may be possible that a shop clerk asks a customer to enter a mail address in a cashier and then sends receipt data to the entered email address. However, it is burdensome to enter the mail address in the cashier, and therefore this is not realistic.

When a user touches a tablet, his/her registered mail address is displayed and a shop clerk sends invoice data to the email address (the shop clerk keeps a copy of the receipt). This is equivalent to taking in receipts (equivalent to invoices) for the settlement of expenses in a company. Especially, large companies have great needs for such a system.

According to one aspect, it becomes possible to view all invoices of a company or group companies and perform the unified management of information about the invoices.

While this present disclosure has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An information processing apparatus networked with a plurality of user terminals, the apparatus comprising:
   a communications interface configured to,
      communicate with a first terminal of the user terminals to cause the first terminal to display a registration graphical user interface receiving a plurality of unique information pieces for a first user,
      communicate with a second terminal of the user terminals to cause the second terminal to display the registration graphical user interface receiving a plurality of unique information pieces for a second user, and
      communicate with the first terminal to cause the first terminal to display a sharing graphical user interface receiving user identification information for the second user in association with an electronic business document received from the first terminal;
   a first storage unit configured to store user information associating, for each individual user, user identification information identifying each of the individual users with the plurality of unique information pieces received from the registration graphical user interface for the individual user;
   a generation unit configured to generate a code for each of the individual users using the plurality of unique information pieces for the individual user and the user identification information of the individual user stored in the first storage unit, wherein the generating creates the code as a string stored in the first storage unit that is a concatenation of characters from characters in the unique information pieces of the individual user, wherein the user information further associates, for each individual user, the code for each individual user, and wherein the code is not displayed to the individual users;
   a second storage unit configured to store business document information for the electronic business document including the user identification information of a first user included in the user information stored in the first storage unit; and
   a processing unit that is configured to determine, upon receiving an access request for accessing the business document information from a second user whose user information is stored in the first storage unit, whether a first code of the first user matches a second code of the second user, and granting, when the first code and the second code match, the second user access rights to access the business document information that is generated by the first user and stored in the second storage unit.

2. The information processing apparatus according to claim 1, wherein,
   the user identification information is an electronic mail address,
   the business document information includes an electronic mail address of a user who is a receiver of a business document and an electronic mail address of a user who is a sender of the business document, and
   the processing unit is configured to,
      detect a code associated with the user who is the receiver of the business document, based on the electronic mail address included in the business document information, and stores the detected code in association with the business document information,
      receive a view request for the business document, the view request including the electronic mail address of the user who is the receiver of the business document, detect the code associated with the user who is the receiver of the business document, based on the electronic mail address included in the view request, and collectively make business document information associated with a code matching the detected code viewable by the user who is the receiver.

3. The information processing apparatus according to claim 2, wherein, the business document is an invoice, and the processing unit is configured to calculate a total invoice amount of the business document information associated with the code matching the detected code, and make the total invoice amount viewable by the user who is the receiver.

4. The information processing apparatus according to claim 2, wherein, the business document information includes a first account number designated by the sender, and the processing unit is configured to, designate a second account number different from the first account number, as a transfer account, when allowing the user who is the receiver to view the total amount, and make a deposit of each invoice amount indicated in the business document information to an account with the first account number, using an amount deposited to an account with the second account number.

5. The information processing apparatus according to claim 2, wherein, the processing unit compiles business document information whose inspection is completed by the user who is the receiver of the business document.

6. The information processing apparatus according to claim 1, wherein the first terminal and the second terminal are separately owned and operated, and wherein the information processing apparatus mediates all communication on the electronic business document between the first terminal and the second terminal.

* * * * *